(12) United States Patent
Meuler et al.

(10) Patent No.: US 10,946,399 B2
(45) Date of Patent: Mar. 16, 2021

(54) LIQUID RESERVOIRS AND ARTICLES COMPRISING A REPELLENT SURFACE COMPRISING A SILOXANE MATERIAL

(71) Applicant: 3M INNOVATIVE PROPERTIES COMPANY, St. Paul, MN (US)

(72) Inventors: Adam J. Meuler, Woodbury, MN (US); Elaine M. Yorkgitis, St. Paul, MN (US); David S. Hays, Woodbury, MN (US); Kent C. Hackbarth, River Falls, WI (US); Stephen C. P. Joseph, Woodbury, MN (US); Cheryl L. S. Elsbernd, Woodbury, MN (US); Jon P. Nietfeld, Woodbury, MN (US); Phillip H. Henna, Cottage Grove, MN (US); David J. Kinning, Woodbury, MN (US); Nicholas L. Untiedt, Minneapolis, MN (US); Jeffrey O. Emslander, Grant, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 136 days.

(21) Appl. No.: 16/080,444

(22) PCT Filed: Apr. 26, 2017

(86) PCT No.: PCT/US2017/029569
§ 371 (c)(1),
(2) Date: Aug. 28, 2018

(87) PCT Pub. No.: WO2017/189681
PCT Pub. Date: Nov. 2, 2017

(65) Prior Publication Data
US 2019/0060927 A1     Feb. 28, 2019

Related U.S. Application Data

(60) Provisional application No. 62/327,783, filed on Apr. 26, 2016.

(30) Foreign Application Priority Data

Oct. 21, 2016    (WO) ................ PCT/US2016/058166

(51) Int. Cl.
*B32B 1/08*     (2006.01)
*B05B 7/24*     (2006.01)
(Continued)

(52) U.S. Cl.
CPC .......... *B05B 7/2478* (2013.01); *B05B 7/2408* (2013.01); *B05B 7/2481* (2013.01);
(Continued)

(58) Field of Classification Search
CPC ... B05B 7/2478; B05B 7/2481; B05B 7/2408; C08K 5/02; C08K 5/5415; C09D 167/02; C09D 201/04
See application file for complete search history.

(56) References Cited

U.S. PATENT DOCUMENTS 2,504,482 A    4/1950   Goldman
2,622,598 A    12/1952  Rosenblum
(Continued)

FOREIGN PATENT DOCUMENTS

CA    2079542    4/1993
CN    1279697    1/2001
(Continued)

OTHER PUBLICATIONS

Cansealid Paint Can Lids, http://www.cansealid.com, pp. 1-4, Mar. 30, 2017.
(Continued)

*Primary Examiner* — Michael C Miggins
(74) *Attorney, Agent, or Firm* — Carolyn A. Fischer

(57) ABSTRACT

Presently describes are articles, such as liquid reservoirs, comprising a liquid repellent surface. The liquid repellent
(Continued)

surface comprises a surface layer comprising a silane or siloxane material, wherein the liquid repellent surface is not a lubricant impregnated surface. In one embodiment, the liquid repellent surface (e.g. layer) comprise a silicone melt additive and a thermoplastic polymeric material component. In some embodiments, the article (e.g. liquid reservoir) comprise a thermoplastic polymeric material.

20 Claims, 4 Drawing Sheets

(51) Int. Cl.
  C08K 5/02      (2006.01)
  C09D 167/02    (2006.01)
  C08K 5/5415    (2006.01)
  C09D 201/04    (2006.01)
  B05D 5/08      (2006.01)
  B32B 1/00      (2006.01)

(52) U.S. Cl.
  CPC ........ B05D 5/083 (2013.01); C08K 5/02 (2013.01); C08K 5/5415 (2013.01); C09D 167/02 (2013.01); C09D 201/04 (2013.01); B32B 1/00 (2013.01); B32B 1/08 (2013.01); Y10T 428/13 (2015.01); Y10T 428/1352 (2015.01)

(56) References Cited

U.S. PATENT DOCUMENTS

| | | |
|---|---|---|
| 2,688,568 A | 9/1954 | Miskel |
| 2,803,656 A | 8/1957 | Ahlbrecht |
| 3,372,125 A | 3/1968 | Hill |
| 3,746,196 A | 7/1973 | Sako |
| 3,759,874 A | 9/1973 | Gresham |
| 3,787,351 A | 1/1974 | Olson |
| 4,209,610 A | 6/1980 | Mares |
| 4,301,208 A | 11/1981 | Jellinek |
| 4,508,916 A | 4/1985 | Newell |
| 4,595,628 A | 6/1986 | Kelly |
| 5,169,900 A | 12/1992 | Gudelis |
| 5,187,015 A | 2/1993 | Yorkgitis |
| 5,213,743 A | 5/1993 | Ohara |
| 5,221,497 A | 6/1993 | Watanabe |
| 5,267,693 A | 12/1993 | Dickey |
| 5,350,795 A | 9/1994 | Smith |
| 5,459,188 A | 10/1995 | Sargent |
| 5,476,901 A | 12/1995 | Smith |
| 5,560,544 A | 10/1996 | Merritt |
| 5,560,992 A | 10/1996 | Sargent |
| 5,582,350 A | 12/1996 | Kosmyna |
| 5,618,903 A | 4/1997 | Hoxmeier |
| 5,637,657 A | 6/1997 | Anton |
| 5,641,835 A | 6/1997 | Smith |
| 5,670,573 A | 9/1997 | Kirchner |
| 5,674,592 A | 10/1997 | Clark |
| 5,728,469 A | 3/1998 | Mann |
| 5,747,392 A | 5/1998 | Xiao |
| 5,789,491 A | 8/1998 | Liss |
| 5,798,402 A | 8/1998 | Fitzgerald |
| 5,859,126 A | 1/1999 | Anton |
| 5,898,046 A | 4/1999 | Raiford |
| 5,914,384 A | 6/1999 | Anton |
| 5,977,390 A | 11/1999 | Raiford |
| 6,013,715 A | 1/2000 | Gornowicz |
| 6,063,474 A | 5/2000 | Raiford |
| 6,114,419 A | 9/2000 | Liss |
| 6,127,485 A | 10/2000 | Klun |
| 6,150,020 A | 11/2000 | Dharmadhikary |
| 6,171,983 B1 | 1/2001 | Coppens |
| 6,183,872 B1 | 2/2001 | Tanaka |
| 6,262,180 B1 | 7/2001 | Klun |
| 6,361,870 B1 | 3/2002 | Steffl |
| 6,362,135 B1 | 3/2002 | Greer |
| 6,387,999 B1 | 5/2002 | Dirschl |
| 6,462,115 B1 | 10/2002 | Takahashi |
| 6,465,107 B1 | 10/2002 | Kelly |
| 6,511,753 B1 | 1/2003 | Teranishi |
| 6,586,522 B1 | 7/2003 | Jariwala |
| 6,664,318 B1 | 12/2003 | Bymark |
| 6,753,380 B2 | 6/2004 | Qiu |
| 6,803,109 B2 | 10/2004 | Qiu |
| 6,860,926 B2 | 3/2005 | Ishikawa |
| 6,908,607 B2 | 6/2005 | Banerjee |
| 7,041,727 B2 | 5/2006 | Kubicek |
| 7,105,233 B2 | 9/2006 | Bechthold |
| 7,375,698 B2 | 5/2008 | Wolfenden |
| 7,396,866 B2 | 7/2008 | Jariwala |
| 7,399,807 B2 | 7/2008 | Day |
| 7,659,351 B2 | 2/2010 | Caldwell |
| 7,718,264 B2 | 5/2010 | Klun |
| 7,857,905 B2 | 12/2010 | Hayes |
| 7,897,666 B1 | 3/2011 | Berg |
| 8,110,037 B2 | 2/2012 | Russell |
| 8,497,021 B2 | 7/2013 | Simpson |
| 8,535,779 B1 | 9/2013 | Smith |
| 8,574,704 B2 | 11/2013 | Smith |
| 8,821,984 B2 | 9/2014 | Jariwala |
| 8,993,116 B2 | 3/2015 | Jariwala |
| 9,012,548 B2 | 4/2015 | Inagaki |
| 9,175,188 B2 | 11/2015 | Buckanin |
| 9,187,678 B2 | 11/2015 | Boardman |
| 9,197,678 B2 | 11/2015 | Heinla |
| 9,353,646 B2 | 5/2016 | Aizenberg |
| 9,371,173 B2 | 6/2016 | Smith |
| 9,441,079 B2 | 9/2016 | Yang |
| 2003/0235696 A1 | 12/2003 | Byrd |
| 2004/0037961 A1 | 2/2004 | Dieleman |
| 2004/0092675 A1 | 5/2004 | Moore |
| 2004/0213904 A1 | 10/2004 | Muller |
| 2005/0016489 A1 | 1/2005 | Endicott |
| 2005/0054804 A1 | 3/2005 | Dams |
| 2005/0121644 A1 | 6/2005 | Dams |
| 2005/0145134 A1 | 7/2005 | Petrin |
| 2005/0164010 A1 | 7/2005 | Trombetta |
| 2005/0234147 A1 | 10/2005 | Sakabe |
| 2006/0142474 A1 | 6/2006 | Moore |
| 2006/0153993 A1 | 7/2006 | Schmidt |
| 2006/0209127 A1 | 9/2006 | Inoue |
| 2006/0248656 A1 | 11/2006 | Tung |
| 2006/0281861 A1 | 12/2006 | Putnam |
| 2008/0039558 A1 | 2/2008 | Lazzari |
| 2008/0047465 A1 | 2/2008 | Yen |
| 2008/0299347 A1 | 12/2008 | Ukei |
| 2008/0306238 A1 | 12/2008 | Jariwala |
| 2009/0069464 A1 | 3/2009 | Standke |
| 2009/0081384 A1 | 3/2009 | Plissonnier |
| 2009/0203276 A1 | 8/2009 | Kutsenko |
| 2009/0294724 A1 | 12/2009 | Attar |
| 2010/0035039 A1 | 2/2010 | Jing |
| 2010/0047845 A1 | 2/2010 | Woodside |
| 2010/0092621 A1 | 4/2010 | Akutsu |
| 2010/0107556 A1 | 5/2010 | Monti |
| 2010/0314575 A1 | 12/2010 | Gao |
| 2011/0033694 A1 | 2/2011 | Jing |
| 2011/0135839 A1 | 6/2011 | Dziomkina |
| 2011/0207038 A1 | 8/2011 | Yu |
| 2011/0229667 A1 | 9/2011 | Jin |
| 2011/0305738 A1 | 12/2011 | Ladizinsky |
| 2012/0107556 A1 | 5/2012 | Zhang |
| 2013/0045332 A1 | 2/2013 | Fang |
| 2013/0140004 A1 | 6/2013 | Behrens |
| 2013/0178568 A1 | 7/2013 | Meuler |
| 2013/0216820 A1 | 8/2013 | Riddle |
| 2013/0224478 A1 | 8/2013 | Jing |
| 2013/0251946 A1 | 9/2013 | Azimi |
| 2014/0120340 A1 | 5/2014 | Riddle |
| 2014/0147627 A1 | 5/2014 | Aizenberg |
| 2014/0147631 A1 | 5/2014 | Yang et al. |
| 2014/0178611 A1 | 6/2014 | Smith |
| 2014/0287243 A1 | 9/2014 | Weber |

(56) References Cited

U.S. PATENT DOCUMENTS

| | | |
|---|---|---|
| 2014/0295149 A1 | 10/2014 | Ito |
| 2014/0311940 A1 | 10/2014 | Braveman |
| 2014/0322543 A1 | 10/2014 | Jonckheree |
| 2015/0166820 A1 | 6/2015 | Ikeyama |
| 2015/0238909 A1 | 8/2015 | Mori |
| 2015/0273522 A1 | 10/2015 | Boscher |
| 2015/0307731 A1 | 10/2015 | Bechtel |
| 2015/0352546 A1 | 12/2015 | Egeler |
| 2016/0200915 A1 | 7/2016 | Radchenko |

FOREIGN PATENT DOCUMENTS

| | | |
|---|---|---|
| CN | 101358106 | 2/2009 |
| CN | 101575478 | 11/2009 |
| CN | 102031057 | 11/2010 |
| CN | 102321415 | 1/2012 |
| CN | 103998414 | 8/2014 |
| DE | 10004132 | 8/2001 |
| EP | 0339583 | 11/1989 |
| EP | 0484093 | 5/1992 |
| EP | 0860490 | 8/1998 |
| EP | 0905179 | 3/1999 |
| EP | 0768921 | 10/1999 |
| EP | 1493761 | 1/2005 |
| EP | 2607397 | 6/2013 |
| JP | S56-154860 | 11/1981 |
| JP | S61-023656 | 7/1984 |
| JP | H01313582 | 12/1989 |
| JP | 3-41160 | 2/1991 |
| JP | 4-5260 | 1/1992 |
| JP | H045260 | 1/1992 |
| JP | H04149294 | 5/1992 |
| JP | H4270649 | 9/1992 |
| JP | 5-239381 | 9/1993 |
| JP | 5-331407 | 12/1993 |
| JP | 05338087 | 12/1993 |
| JP | H06316548 | 11/1994 |
| JP | 2000-087014 | 3/2000 |
| JP | 2001-508698 | 7/2001 |
| JP | 2002-053792 | 2/2002 |
| JP | 3306454 | 7/2002 |
| JP | 2004-531598 | 10/2004 |
| JP | 2007-297543 | 11/2007 |
| JP | 2008-524376 | 7/2008 |
| JP | 2014-509959 | 7/2008 |
| JP | 2010-222559 | 10/2010 |
| JP | 201167710 | 4/2011 |
| JP | 2015-144548 | 8/2015 |
| WO | WO 94/26830 | 11/1994 |
| WO | WO 1996-01152 | 1/1996 |
| WO | WO 1996-39349 | 12/1996 |
| WO | WO 1998-32539 | 7/1998 |
| WO | WO 98/43894 | 10/1998 |
| WO | WO 1998-43886 | 10/1998 |
| WO | WO 2002/072657 | 9/2002 |
| WO | WO 2004-090065 | 10/2004 |
| WO | WO 2005/113690 | 12/2005 |
| WO | WO 2008-104063 | 9/2008 |
| WO | WO 2008-154414 | 12/2008 |
| WO | WO 2009-045856 | 4/2009 |
| WO | WO 2009-140482 | 11/2009 |
| WO | WO 2010-002859 | 1/2010 |
| WO | WO 2010/062843 | 6/2010 |
| WO | WO 2012/051093 | 4/2012 |
| WO | WO 2012-064646 | 5/2012 |
| WO | WO 2012-100099 | 7/2012 |
| WO | WO 2012-121858 | 9/2012 |
| WO | WO 2012-173803 | 12/2012 |
| WO | WO 2013-115868 | 8/2013 |
| WO | WO 2013-127054 | 9/2013 |
| WO | WO 2013-172823 | 11/2013 |
| WO | WO 2013-177579 | 11/2013 |
| WO | WO 2014-010534 | 1/2014 |
| WO | WO 2014-012039 | 1/2014 |
| WO | WO 2014-012052 | 1/2014 |
| WO | WO 2014-012072 | 1/2014 |
| WO | WO 2014-012078 | 1/2014 |
| WO | WO 2014-012079 | 1/2014 |
| WO | WO 2014-012080 | 1/2014 |
| WO | WO 2014/035742 | 3/2014 |
| WO | WO 2014-078867 | 5/2014 |
| WO | WO 2014-097309 | 6/2014 |
| WO | WO 2014-107811 | 7/2014 |
| WO | WO 2014-148909 | 9/2014 |
| WO | WO 2014-209441 | 12/2014 |
| WO | WO 2015-074077 | 5/2015 |
| WO | WO 2015/084617 | 6/2015 |
| WO | WO 2015/157219 | 10/2015 |
| WO | WO 2015/161233 | 10/2015 |
| WO | WO 2016-069239 | 5/2016 |
| WO | WO 2016-069674 | 5/2016 |
| WO | WO 2016-176350 | 11/2016 |
| WO | WO 2017-074708 | 5/2017 |
| WO | WO 2017-074709 | 5/2017 |
| WO | WO 2017-074817 | 5/2017 |
| WO | WO 2017-189215 | 11/2017 |
| WO | WO 2017-189475 | 11/2017 |
| WO | WO 2017-189681 | 11/2017 |
| WO | WO 2017-189684 | 11/2017 |

OTHER PUBLICATIONS

Dow Corning Ultra Hight Molecular Weight Functional Siloxane Additives in Polymers: Effects on Processing and Properties p. 1-16 2001.
Dow Corning MB50-002 Masterbatch Product Information, Jun. 2, 2014, pp. 1-4.
Liquiglide, Videos available on the website <www.liquiglide.com>, Accessed on Jul. 31, 2014, 5 pages.
Yilgor, Progress in Polymer Science Silicone containing copolymers: Synthesis, properties and applications 2014 1165-1195.
"Adaptive Surface Coatings, High Performance, Low Environmental Impact", [retrieved from the internet on Jun. 18, 2018], URL <https://adaptivesurface.tech/ >, previously Slips technologies, pp. 1-6.
Bohn, "Insect Aquaplaning: Nepenthes Pitcher Plants Capture Prey with the Peristome, a Fully Wettable Water-Lubricated Anisotropic Surface", Proceedings of the National Academy of Sciences, Sep. 28, 2004, vol. 101, No. 39, pp. 14138-14143.
Bragg, The Form Birefringence of Macromolecules, Acta Cryst. 1953, vol. 6, pp. 865-867.
Cab-O-Sperse Dipersions for Industrial Coatings, Application Guide, Cabot, 2013, 2 pages.
Chhatre, "Thermal Annealing Treatment to Achieve Switchable and Reversible Oleophobicity on Fabrics," Langmuir, 2009, vol. 25, pp. 13625-13632.
Chhatre, "Fluoroalkylated Silicon-Containing Surfaces—Estimation of Solid-Surface Energy", Applied materials and interfaces, 2010, No. 12, vol. 02, pp. 3544-3554.
Deltron High Velocity Clearcoat, DC3000, 2006, 4 pages.
Diatomaceous earth, [Online] {retrieved from internet on Jun. 8, 2014}, URL <http:l/en.wikipedia.org/wiki/Diatomaceaus earth>, 1 page.
Douillard et al. "Contact Angles of Water-2-Butoxyethanol System Against Glass Exploration of the Phase Diagram," Advances in Colloid and Interface Science 39 (1992) 225-234.
DuPont FEP Film, Fluorocarbon Film—Information bulletin, DUPONT, 9pages.
DuPont FEP Film, Fluorocarbon Film—Properties bulletin, DUPONT, 4pages.
DuPont Teflon PTFE fluoropolymer resin, 38 pages.
DuPont Zonyl 8857A, Anti-Block and cleanability Additive, DUPONT, 2pages.
DuPont Zonyl Fluoroadditives for coatings Technical Information, 2003, 4 pages.
Earlex HV5500 or HV6900 1 qt. PTFE Coated Metal Paint Container, 2015, 2 pages.
Elvacite 1010 Macromonomer, Lucite International Inc., Specialty, Polymers & Resins Ltd, 5 pages.

(56) References Cited

OTHER PUBLICATIONS

Estane 5703 TPU, Lubrizol Engineered Polymers, 2014, 1 page.
Gao, "Teflon is Hydrophilic. Comments on Definitions of Hydrophobic, Shear versus Tensile Hydrophobicity, and Wettability Characterization", Langmuir, 2008, vol. 24, No. 17, pp. 9183-9188.
Gao, "Wetting 101," Langmuir, Jul. 2009, vol. 25, No. 24, pp. 14105-14115.
Gelest Inc., "Silane Coupling Agents: Connecting Across Boundaries v. 2.0," 2006, pp. 1-54.
Gemici, Hydrothermal Treatment of Nanoparticle Thin Films for Enhanced Mechanical Durability, Langmuir, 2008, vol. 24, pp. 2168-2177.
Huang, "Omniphobic Slippery Coatings Based on Lubricant-Infused Porous Polyelectrolyte Multilayers", ACS Macro Lett. 2013, vol. 2, pp. 826-829.
Jellinek, "Ice releasing block-copolymer coating", Colloid & Polymer Science, 1978, vol. 256, No. 6, pp. 544-551.
Krumpfer, "Contact angle hysteresis: a different view and a trivial recipe for low hysteresis hydrophobic surfaces", Faraday Discussions, 2010, vol. 146, pp. 103-111.
Li, What do we need for a superhydrophobic surface? A review on the recent progress in the preparation of superhydrophobic surfaces, Chem. Soc. Rev., 2007, vol. 36, pp. 1350-1368.
LiquiGlide Coating for Paint Eliminates a Sticky Problem, 2 pages.
Madani, The aggregation status of nanosilicas and silica fume, used in cementitious mixtures, Third International Conference on Sustainable Construction Materials and Technologies, 10 pages.
Marflex 1122 Polyethylene-Safety data sheet, Chevron Philips, 2015, 10pages.
Material Safety Data Sheet, Envirobase HP, Sep. 9, 2014, 11 pages.
Material Safety Data Sheet, High Velocity Clearcoat, DC3000, Mar. 15, 2014, 11 pages.
Material Safety Data Sheet, Mid Temp Hardener, DCH3085, Mar. 15, 2014, 10 pages.
Meuler, "Examination of wettability and surface energy in fluorodecyl POSS/polymer blends", The Royal Society of Chemistry, 2011, vol. 7, pp. 10122-10134.
Meuler, "Relationships between Water Wettability and Ice Adhesion", Applied Materials and Interfaces, 2010, vol. 2, No. 11, pp. 3100-3110.
Norton FEP Fluoropolymer Film, Saint-Gobain Performance Plastics Corporation, 2002, 2 pages.
O'Lenick Jr., "Alkyl Dimethicone", Chapter 10, Silicones for Personal Care, 2nd Edition, pp. 171-175.
Parent, "Anti-Icing and De-Icing Techniques for Wind Turbines: Critical Review", Cold Regions Science and Technology, vol. 65, 2011, pp. 88-96.
Quere, "Non-Sticking Drops", Reports on Progress in physics, Sep. 7, 2005, vol. 68, No. 11, pp. 2495-2532.
Ryan, "Ultra-High-Molecular-Weight Functional Siloxane Additives in Polymer. Effects on Processing and Properties", Journal of Vinyl & Additive Technology, 2000, vol. 06, No. 01, pp. 07-19.
Sacramento Metro AQMD Rule 459 PPG Envirobase High Performance, 2014, 2 pages.
Safety Data Sheet MarFlex 1122 Polyethylene Chevron Phillips Chemical Company LP, Jan. 1, 31, 2015, 10 pages.
Safety Data Sheet, Poly (methyl methacrylate), AlfaAesar A Johnson Matthey Company, May 29, 2015, 4 pages.
Safety Data Sheet, Poly (vinyl chloride), Sigma-Aldrich, Aug. 25, 2015, 8 pages.
Safety Data Sheet, Polystyrene, atactic, Apr. 29, 2015, 4 pages.
Safety Data Sheet, Teflon AF Amorphous Fluoropolymer, 4 pages.
Sayward, "Seeking Low Ice Adhesion", Special Report 79-11; U.S. Army Cold Regions Research and Engineering Laboratory, Hanover, NH, Apr. 1979, 87 pages.
Silazanes—Organosilicon, [Online] [retrieved from internet on Sep. 4, 2014] URL <http://www.sigmaaldrich.com/chemistry/chemistry-products.html ? TablePage=16245452>, 1 page.
Smith, "Droplet mobility on lubricant-impregnated surfaces+", Soft Matter, 2013, vol. 9, No. 6, pp. 1772-1780.
Styron 685D—Product information, AmSty, 2014, 2pages.
Estane 5703 TPU, Lubrizol Engineered Polymers, 3pages.
Teflon AF Amorphous Fluoropolymer-Safety data sheet, DUPONT, 2007, 4pages.
Teflon Beaker Liner Pricing, Welch Fluorocarbon Inc., Feb. 24, 2012, 1 page.
Teng, Overview of the Development of the Fluoropolymer Industry, Applied Science, 2012, vol. 2, pp. 496-512.
The use of AERODISP fumed silica dispersions to enhance waterborne coatings, Technical Information 1371, EVONIK, 16 pages.
Tuteja, "Robust Omniphobic surfaces", Nov. 25, 2008, vol. 105, No. 47, pp. 18200-18205.
Wong, "Bioinspired Self-Repairing Slippery Surfaces with Pressure-Stable Omniphobicity", Nature, Sep. 22, 2011, vol. 477, pp. 443-447.
International Search Report for PCT International Application No. PCT/US2015/057686 dated Mar. 2, 2016, 6 pages.
International Search report for PCT International Application No. PCT/US2017/029240 dated Jul. 13, 2017, 5 pages.
International Search Report and Written Opinion for PCT International Application No. PCT/US2015/054820, dated May 23, 2016, 12 pgs.
International Search Report for PCT International Application No. PCT/US2016/056742, dated Jan. 16, 2017, 5 pages.
International Search Report and Written Opinion for PCT International Application No. PCT/US2016/056749, dated Jan. 12, 2017, 7 pgs.
International Search Report and Written Opinion for PCT International Application No. PCT/US2016/058166, dated Feb. 6, 2017, 17 pgs.

LIQUID RESERVOIRS AND ARTICLES COMPRISING A REPELLENT SURFACE COMPRISING A SILOXANE MATERIAL

CROSS REFERENCE TO RELATED APPLICATIONS

This application is a national stage filing under 35 U.S.C. 371 of PCT/US2017/029569, filed Apr. 26, 2017, which claims the benefit of U.S. Provisional Application No. 62/327,783, filed Apr. 26, 2016, and PCT/US2016/058166, filed Oct. 21, 2016, the disclosures of which is incorporated by reference in their entirety herein.

BACKGROUND

As described for example in WO98/32539, spray application systems for spraying liquids (e.g. paints, garden chemicals etc.) are generally known. Such systems generally comprise a reservoir to contain a liquid and a spray gun through which the liquid is dispensed. The liquid may be fed from the reservoir under gravity and/or it may be entrained in a stream of pressurized liquid, for example air or water, which is supplied to the gun from an external source.

As also described in WO98/32539 disposable liners have been used with (e.g. re-usable) liquid reservoirs. The liner may aid in disposal of the contents; protect the reservoir or its contents; as well as facilitate or even eliminate the cleaning of the reservoir.

SUMMARY

With current spray (e.g. paint) application systems, a portion of the liquid (e.g. paint) is retained within the liquid reservoir or liner after dispensing the liquid. Depending on the size of the liquid reservoir or liner, the amount of retained paint may range from about ½ to 1 ounce. In the case of relatively expensive liquids, such as colored automobile base coat paints that can cost $3-$6 per sprayable ounce, the cost of such wasted retained (e.g. paint) liquid can be substantial. Thus, industry would find advantage in minimizing the amount of paint or other liquid that is retained on articles, such as components of spray application systems and other articles.

One commonly known class of fluoropolymer is Teflon™ PTFE resin or in other words polytetrafluoroethylene polymers prepared by the polymerization of the monomer tetrafluoroethylene ("TFE" having the structure $CF_2=CF_2$). Teflon™ PTFE resins are described as crystalline materials. Crystalline PTFE resins typically have a density of about 2.2 $g/cm^3$.

It has been found that Teflon™ PTFE does not provide a liquid repellent surface such that the receding contact angle with water is at least 90 degrees and/or the difference between the advancing contact angle and the receding contact angle of the surface with water is less than 10. Further, Teflon™ PTFE also does not provide an (e.g. aqueous) paint repellent surface as determined by test methods set forth in the examples.

Presently described are liquid reservoirs and other articles comprising a liquid repellent surface (e.g. layer). The liquid repellent surface comprises a silane or siloxane (e.g. polydimethylsiloxane) material, wherein the liquid repellent surface is not a lubricant impregnated surface. In some embodiments, the liquid repellent surface comprises a (e.g. layer of) thermally processible polymer and a siloxane melt additive. In some embodiments, the (e.g. liquid reservoir) article comprises a thermoplastic polymeric material. In some embodiments, the liquid reservoir is a (e.g. removable) liner.

DETAILED DESCRIPTION

Presently described are liquid reservoirs and other articles comprising a liquid repellent surface (e.g. layer). Liquid reservoirs and liners thereof can be components of a spray application system. However, liquid repellent articles such as liquid reservoirs and liners thereof also have other uses wherein such articles are not components of a spray application system.

Illustrative liquid repellent articles include for example various liquid reservoirs including (e.g. paint, viscosity measurement) cups, (e.g. paint) cans, (e.g. paint) buckets, (e.g. paint toner) bottles, (e.g. paint) trays and liners thereof, drums, beakers and liners thereof; as well as lids for such liquid reservoirs.

In some embodiments, the liquid reservoirs or in other words containers have a capacity ranging from 100 ml to 1 liter. In other embodiments, the liquid reservoirs may contain less than 100 ml. For example, the capacity may be at least 5, 10 or 15 ml ranging up to 25, 50, 75, or 100 ml. In other embodiments, the liquid reservoirs may contain greater than 1l. For example, the capacity may be at least 2, 3, 4, 5, 6, 7, 8, 9, or 10 liters, ranging up to the size of a 55 gals drum or greater.

Other articles include for example hoses, tubes, handles (e.g. of paint applicator such as a roller, brush, foam), stirring utensils (e.g. stick, spoon), pipette and pipette tips, funnels, strainers, filters, and pour spouts.

In yet another embodiment, the article may be a packaging or protection film. The packaging or protection film is typically in the form of a single layer or multilayer film and may be characterized as a wrap.

Various single layer and multilayer films are described for example in U.S. Pat. No. 9,187,678; incorporated herein by reference. The thickness of the various single layer and multilayer film can vary. In the case of multilayer film constructions, the thickness is typically at least 0.1, 0.5, 5, 10, 15, 20, or 25 microns. The thickness of single layer and multilayer films can range up to 1 cm, yet are typically no greater than 10, 8, 9, 7, 6, 5, 4, 3, or 2 mils.

The packaging film may be converted into a specific shape including an enclosure such as in the case of bags, envelopes, pouches, etc. In some embodiments, the packaging film or enclosure may be filled and heat sealed. The packaging film or enclosure may be utilized to line a box, tote, or other container to thereby provide a liquid repellent barrier or enclosure.

The forthcoming discussion emphasizes liquid reservoirs, liners and lids (e.g. components of a spray application system) as illustrative articles. Further the forthcoming discussion emphasizes "paint" as a liquid the repellent article repels. The articles and repellent surfaces described herein are applicable to other household and industrial liquids, especially water-based liquids such as paint and adhesive, as well as polypropylene glycol and derivatives thereof.

Figure 1:
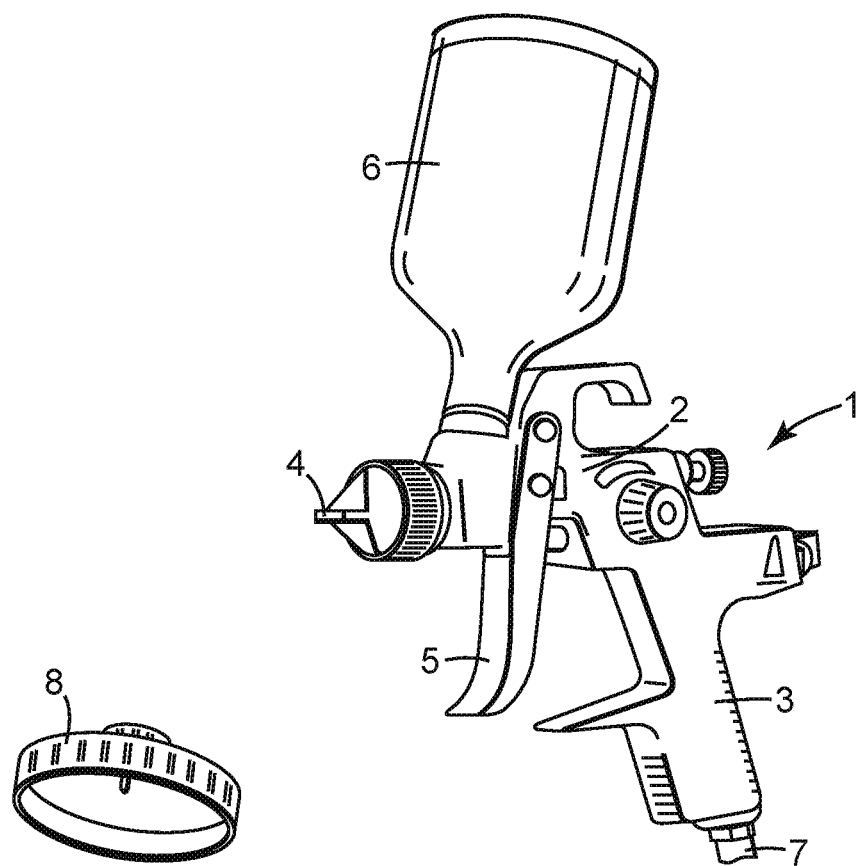
FIG. 1 is a perspective view of a spray application system.

FIG. 1 illustrates an embodied spray application system. The gun 1 comprises a body 2, a handle 3 which extends downwards from the rear end of the body, and a spray nozzle 4 at the front end of the body. The gun is manually-operated by a trigger 5 which is pivotally-mounted on the sides of the gun. The liquid (e.g. paint) reservoir 6 is located on the top of the body 2 and communicates with an internal (e.g. air) passageway (not visible) which extends through the gun from a connector 7 at the lower end of the handle 3 to the nozzle 4. During use, liquid (e.g. paint) is provided in reservoir 6. Removable lid 8 is engaged with the open end of (e.g. paint) liquid reservoir 6. Further, connector 7 is connected to a source of compressed air (not shown) so that, when the user pulls on the trigger 5, compressed air is delivered through the gun to the nozzle 4 (or functionally similar assembly) and entrains and atomizes paint being delivered under gravity from liquid reservoir 6. The liquid (e.g. paint) is then discharged through the nozzle 4 with the compressed air, as a spray.

Various spray gun designs can be utilized in the embodied spray application system, such as described for example in U.S. Pat. Nos. 5,582,350; 5,267,693; and EP 0768 921. In some embodiments, the spray application system may further comprise tubes or hoses, typically disposed between the (e.g. paint) liquid reservoir and the gun.

Figure 2:
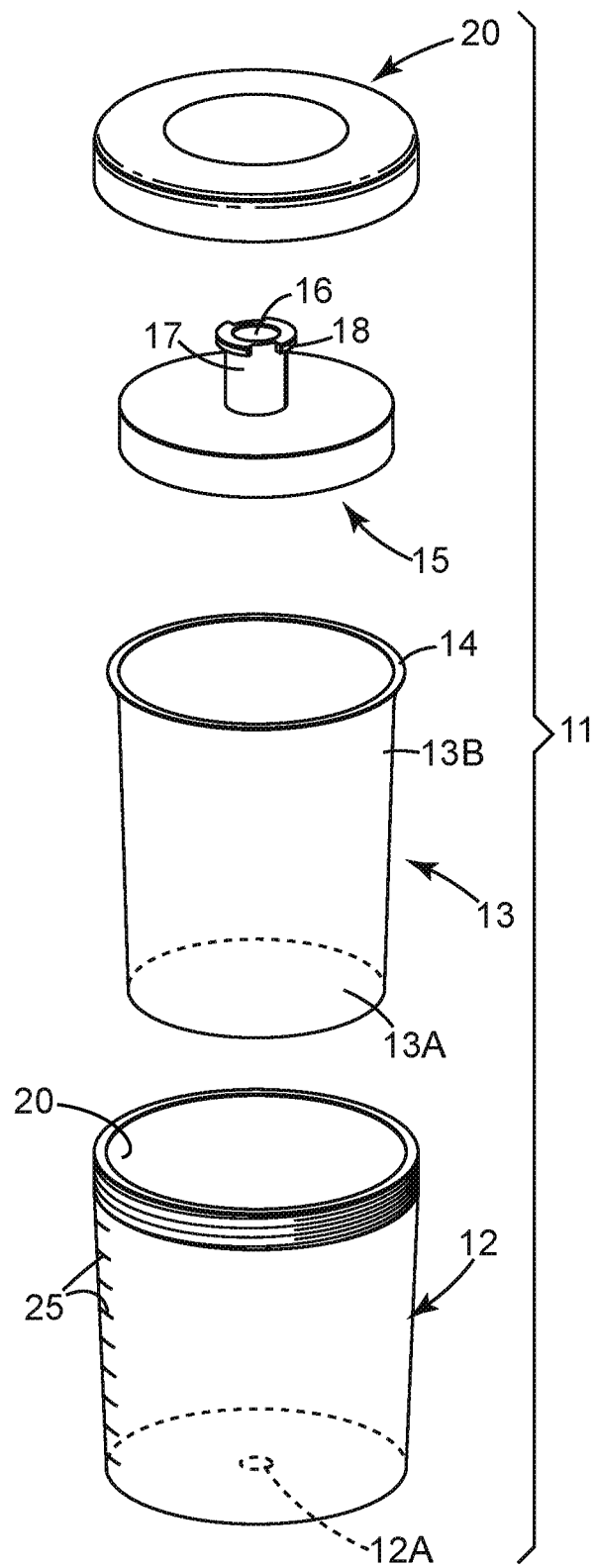
FIG. 2 shows an exploded view of articles (e.g. components of) a liquid (e.g. paint) reservoir further comprising a liner for the gun of FIG. 1.
Figure 3:
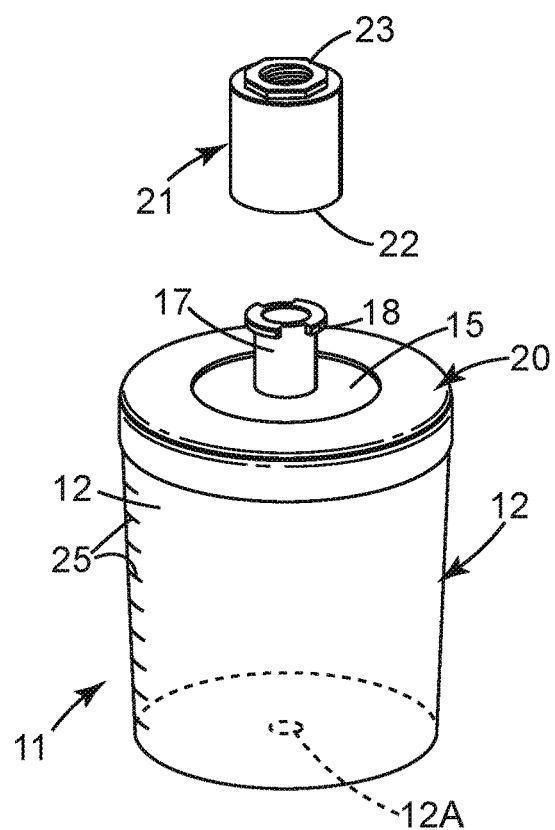
FIG. 3 shows the liquid reservoir of FIG. 2 in an assembled condition, with an adapter 21 for connecting the liquid reservoir to a spray gun.

FIG. 2 illustrates the components of another embodied liquid (e.g. paint) reservoir 11 that can be used with the gun 1 of FIG. 1 (or any similar gun) instead of liquid (e.g. paint) reservoir 6. The liquid (e.g. paint) reservoir 11 comprises an open container 12, of suitable size for attachment to a (e.g. hand-held) spray gun, having an air hole 12A in its base and provided with a liner 13. The liner 13 corresponds in shape to and fits within the interior of container 12. The (e.g. removable) liner may have a narrow rim 14 at the open end that contacts the top edge of the container 12. The container 12 also has a (e.g. disposable) lid 15. Lid 15 typically engages rim 14 of the open end of the liner 13 and is held firmly in place when lid 15 is attached to container 12. The lid can be attached by an annular collar 20 which screws onto the container, such as depicted in FIG. 3.

Liquid reservoir 6 or container 12 of the liquid (e.g. paint) reservoir 11 is typically formed from a self-supporting (e.g. rigid) thermoplastic polymeric material, for example polyethylene or polypropylene, of any suitable size. For use with paint spray guns, as well as other uses, containers having a capacity ranging from 100 ml to 1 liter, such as a capacity of 250, 500 or 800 ml, are common. The lid 15 is also typically formed from a thermoplastic polymeric material, for example, polyethylene or polypropylene. The lid may be transparent, translucent or opaque and may optionally be colored. The collar 20 may be a molded thermoplastic or it may be a machined metal (for example, aluminum). In some embodiments, fluid reservoir 6 and container 12 are formed by injection molding of a thermoplastic polymer.

Liquid reservoir 6, as well as liner 13, are typically also self-supporting but can also be collapsible, i.e. collapses when (e.g. paint) liquid is withdrawn from the liner or liquid (e.g. paint) reservoir during operation of the spray gun. In one embodiment, the liner 13 or liquid (e.g. paint) reservoir 6 have a (e.g. thicker) rigid base 13A and (e.g. thinner) flexible side walls 13B. In this embodiment, the base may have a thickness of about 250 to 400 microns. In contrast, the side walls can range from about 100 to 250 microns and in some embodiments are no greater than 225, 200 or 175 microns. When the liner collapses, it typically collapses in the longitudinal (or axial) direction by virtue of the side walls collapsing rather than the base. Liner 13 and some embodiments of liquid (e.g. paint) reservoir 6 are preferably formed by thermo/vacuum forming a sheet of thermoplastic material such as low density polyethylene (LDPE). When the liner 13 or liquid (e.g. paint) reservoir 6 is collapsible it can be characterized as a single-use or in other words "disposable" article (e.g. component).

Figure 4:
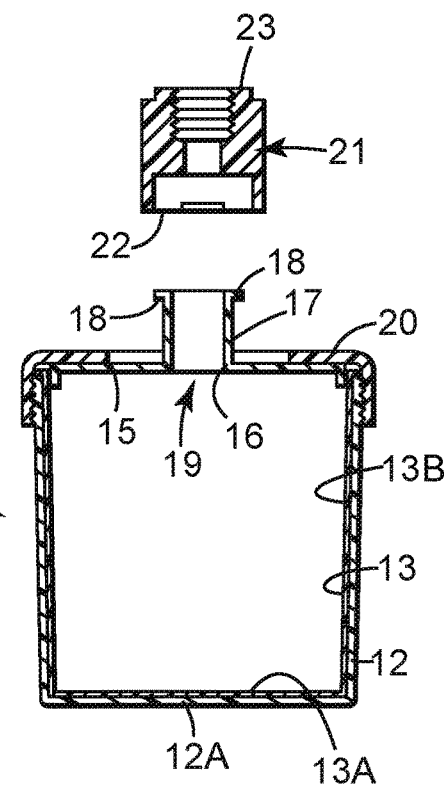
FIG. 4 shows a longitudinal cross-section through the liquid reservoir and the adapter of FIG. 3.

The lid 15 typically includes a (e.g. central) aperture 16 from which extends a connector tube 17 provided, at its end, with outward extensions 18 forming one part of a connection, such as a bayonet connection; i.e. a fitting engaged by being pushed into a socket and then twisted to lock in place. The liquid (e.g. paint) reservoir 11 can be attached to the spray gun 1 through the use of an adapter 21 as depicted in FIG. 3 and FIG. 4. The adapter 21 is a tubular component which, at one end 22, is formed internally with the other part of the (e.g. bayonet) connection for attachment to the connector tube 17. The other end 23 of the adapter can be shaped to match the standard attachment of the spray gun (typically a screw thread). The adapter 21 may be a machined metal component and may, for example, be formed from anodized aluminum or stainless steel.

Figure 5:
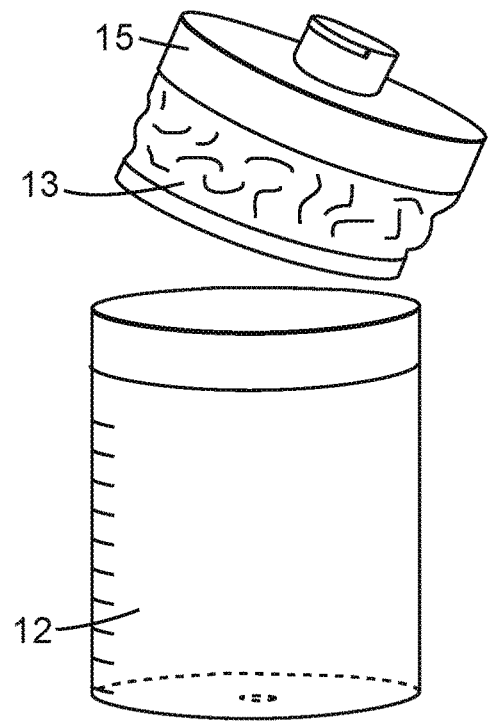
FIG. 5 shows the collapsed liner after the liquid (e.g. paint) has been dispensed from a reservoir or liner.

During use of the spray application system, adapter 21 is securely attached (at end 23) to the spray gun. Liner 13 is inserted into container 12. Liquid (e.g. paint) is then put into liner 13, lid 15 is pushed into place, and collar 20 engaged (e.g. screwed down) tightly with container 12 to hold the lid in position. The rim 14 of the liner 13 is typically held in place between lid 15 and container 12 as shown in FIG. 4. As paint is removed from within the liner 13, the sides of the liner collapse as depicted in FIG. 5 as a result of the decreased pressure within the liner. The base of the liner, being more rigid, retains its shape so that the liner tends to collapse in the longitudinal rather than the transverse direction thereby reducing the possibility of pockets of paint being trapped in the liner.

The liner 13 typically has a smooth (e.g. continuous) internal surface, lacking structures that would increase retention of the liquid (e.g. paint). Thus, the liner typically has no discontinuities (projections or indentations) from a planar surface such as pleats, corrugations, seams, joints, gussets, or groove(s) at the internal junction of the side walls 13B with the base 13A. Further, the liner volumetrically coincides with the inside of the container 12.

Liquid (e.g. paint) can be mixed within liner 13 or within liquid (e.g. paint) reservoir 6. To facilitate the use as a mixing receptacle, the side walls of the container 12 or liquid (e.g. paint) reservoir 6 may be provided with markings 25 (FIGS. 2 and 3) enabling the volume of the contents within the container to be determined.

Although fluid reservoir 6, container 12, and liner 13 may be opaque, such articles (e.g. components) are preferably transparent or translucent such that the liquid can be visually observed through the walls. This can also facilitate using the fluid reservoir 6, or container 12 and liner 13 as a measuring and mixing receptacle.

Liquid (e.g. paint) contained in the liquid reservoir 6 or liner 13 is often mixed by hand. Hand mixing can be beneficial to avoid air entrapment. The inside surfaces of the liquid reservoir 6 or liner 13 are also typically not exposed to high amounts of mixing forces when mixed by hand. However, the side walls of the mixing container may be 'scraped' in order to ensure all of the toners and other ingredients are thoroughly mixed.

In some embodiments, the liners are thermoformed, injection molded, blow molded (or formed using some other plastic processing technique) from materials such as, but not necessarily limited to, low density polyethylene, polypropylene, polyethylene, and/or blends thereof. Suitable liner articles (e.g. components) are commercially available from 3M Company, St. Paul, Minn. under trade designation "3M PPS PAINT PREPARATION SYSTEM".

To ensure that there are no unwanted particles, the liquid (e.g. paint) typically passes through a (e.g. removable) filter as the (e.g. paint) liquid passes from the liquid reservoir 6 or liner 13 to the spray gun or nozzle during use of the spray application system. Such filter can be positioned at various locations. In one embodiment, aperture 16 is covered by a filter mesh 19 which may be a push fit into the aperture or may be an integral part of the lid 15, as depicted in FIG. 4. In another embodiment, a filter may be provided within liquid reservoir 6, as described and depicted in FIG. 12 of WO 98/32539.

FIGS. 1-9 depict examples of illustrative articles such as liquid (e.g. paint) reservoirs, liquid reservoir liners, and lids for liquid (e.g. paint) reservoirs. Such articles (e.g. components) may optionally include various other adaptations as known in the art for spray application systems, as described for example in WO 98/32539.

In the present invention, an article, (e.g. liquid reservoir, a liquid reservoir liner, a lid for a liquid reservoir or liner, component of a spray application system) is described comprising a liquid repellent surface (e.g. layer). The liquid repellent surface layer may be present on a portion of a surface of at least one of such articles (e.g. components) or the liquid repellent surface layer may be present on the entire surface that comes in contact with liquid (e.g. paint) during use. Although the exterior surfaces of the liquid reservoir, liner, lid, etc. may comprise the liquid repellent surface layer described herein, in typical embodiments, the interior surface(s) of the liquid reservoir, liner, and/or lid, comprises a liquid repellent surface layer.

When the liquid (e.g. paint) repellent surface comprises a lubricant impregnated into pores of a porous layer as described in WO2016/069674, the outer exposed surface is predominantly liquid lubricant. Some structures of the porous layer may protrude through the liquid lubricant and be present at the outer exposed surface. However, the outer exposed surface is predominantly liquid lubricant. In this embodiment, typically at least 50, 55, 60, 65, 70, 75, 80, 85, 90, 95% or greater of the surface area is a liquid lubricant, as can be determined by microscopy. Thus, the aqueous liquid (e.g. paint) that is being repelled comes in contact with and is repelled by the liquid lubricant.

By "liquid" it is meant that the lubricant has a dynamic (shear) viscosity of at least about 0.1, 0.5, or 1 mPa-s and no greater than $10^7$ mPa-s at the use temperature. In typical embodiments, the dynamic viscosity is no greater than $10^6$, $10^5$, $10^4$, or $10^3$ mPa-s. The dynamic viscosity values described herein refer to those measured at a shear rate of 1 sec$^{-1}$.

As described herein, the liquid (e.g. paint) repellent surface of the article (e.g. spray application system component) is not a lubricant impregnated surface. Rather the outer exposed surface is predominantly a solid liquid (e.g. paint) repellent material. In this embodiment, less than 50, 45, 40, 35, 30, 25, 20, 15, 10, 5, 4, 3, 2, 1, 0.5, 0.1, 0.005, or 0.001% of the surface area is a liquid lubricant. Rather, at least 50, 55, 60, 65, 70, 75, 80, 85, 90, 95, 96, 97, 98, 99, or 99.5% or greater of the outer exposed surface is a solid liquid-repellent material. Thus, the aqueous liquid (e.g. paint) that is being repelled comes in contact with and is repelled by the solid liquid-repellent material.

The solid liquid (e.g. paint) repellent material is generally a solid at the use temperature of the article (e.g. spray application system component), which commonly ranges from 40° F. to 120° F. In typical embodiments, the solid liquid (e.g. paint) repellent material is a solid at room temperature (e.g. 25° C.). Thus, the solid liquid (e.g. paint) repellent material has a melting temperature (peak endotherm as measured by Differential Scanning calorimetry) greater than 25° C., and typically greater than 120° F. (49° C.). In some embodiments, the solid liquid (e.g. paint) repellent material has a melting temperature no greater than 200° C. The solid (e.g. paint) repellent material may exhibit more than one melting temperature. In typical embodiments, a single solid liquid (e.g. paint) repellent material is utilized. However, when the liquid repellent surface is provided by a coating composition, the coating composition may contain a mixture of solid liquid (e.g. paint) repellent materials.

Figure 6:
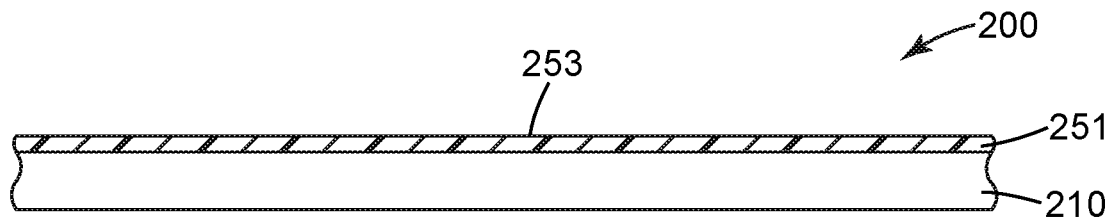
FIG. 6 is cross-sectional view of another embodiment of an article comprising a liquid repellent surface.

With reference to FIG. 6, article 200 is an article (e.g. component of a spray application system) comprising substrate or article (e.g. component) 210 (e.g. a liner, liquid reservoir, or lid) comprising a liquid (e.g. paint) repellent surface 253 that comprises a (e.g. non-fluorinated) organic polymeric binder and a siloxane (e.g. polydimethylsiloxane "PDMS") material. The concentration of siloxane (e.g. PDMS) material at the outer exposed surface (e.g. layer) 253 is typically higher than the concentration within the (e.g. non-fluorinated) organic polymeric binder layer 251 proximate substrate 210. In one embodiment, the liquid (e.g. paint) repellent surface (e.g. layer) can be provided by coating article or substrate 210 with a coating composition comprising an organic solvent, a (e.g. non-fluorinated) organic polymeric binder, and a siloxane (e.g. PDMS) material.

Figure 7:
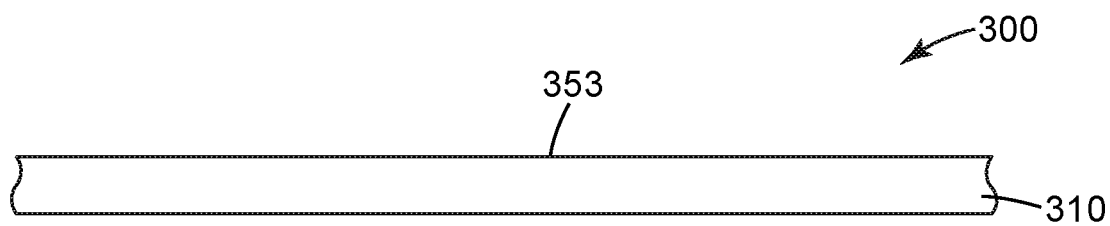
FIG. 7 is cross-sectional view of another embodiment of an article comprising a liquid repellent surface.

With reference to FIG. 7, article 300 is an article (e.g. component of a spray application system) comprising substrate or article (e.g. component) 310 (e.g. a liner, liquid reservoir, or lid) comprising a liquid (e.g. paint) repellent surface (e.g. layer) 353 that comprises a siloxane (e.g. PDMS) material. The concentration of siloxane (e.g. PDMS) material at the outer exposed surface (e.g. layer) 353 is typically higher than the concentration of siloxane (e.g. PDMS) material proximate the center of the substrate 310. In one embodiment, the liquid (e.g. paint) repellent surface 353 can be provided by including a siloxane (e.g. PDMS) material as a melt additive in a polymeric material that is thermally processed to form substrate 310 into an article (e.g. component) such as a liner, liquid reservoir, or lid.

Figure 8:
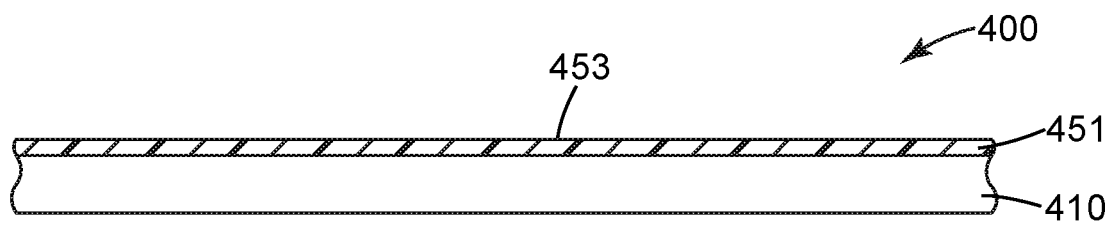
FIG. 8 is cross-sectional view of another embodiment of an article comprising a liquid repellent surface.

With reference to FIG. 8, article 400 is an article (e.g. component of a spray application system) comprising substrate or article (e.g. component) 410 (e.g. a liner, liquid reservoir, or lid) comprising a liquid (e.g. paint) repellent surface 453 that comprises a siloxane (e.g. PDMS) polymer layer, or a polymer comprising both fluorinated and silane or siloxane groups 451. In one embodiment, the liquid (e.g. paint) repellent surface 453 can be provided by coating substrate 410 with a coating composition comprising an organic solvent and a siloxane (e.g. PDMS) polymer, as will subsequently be described. The siloxane content is typically the same throughout the thickness of the siloxane layer. In another embodiment, the liquid (e.g. paint) repellent surface 453 can be provided by coextruding substrate 410 together with a siloxane (e.g. PDMS) polymer layer 451 into a sheet and thermally processing the sheet into an article, such as a liner, liquid reservoir, or lid.

Figure 9:
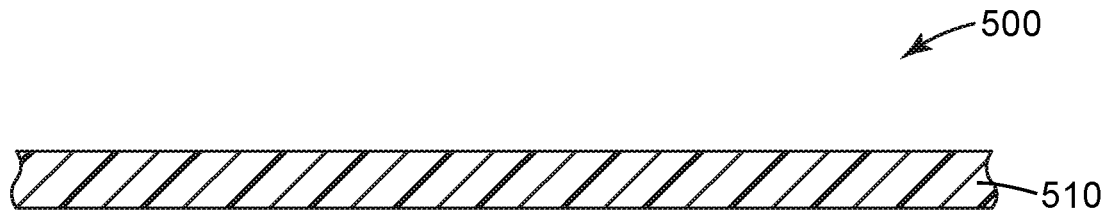
FIG. 9 is cross-sectional view of another embodiment of an article comprising a liquid repellent surface. The cross-sectional drawings are not to scale.

With reference to FIG. 9, article 500 is a substrate or article 510 (e.g. component of a spray application system) such as a liner, liquid reservoir, or lid, comprising a siloxane (e.g. PDMS) polymer. The siloxane content is typically the same throughout the thickness of the substrate or article (e.g. component). The interior and exterior surface of the article (e.g. component) typically comprise siloxane polymer. In another embodiment, the liquid (e.g. paint) repellent surface can be provided by thermally processing a siloxane polymer or a polymer comprising both fluorinated and silane or siloxane groups into an article (e.g. component) such as a liner, liquid reservoir, or lid.

In some embodiments, the (e.g. paint) liquid repellent surface comprises a siloxane (e.g. PDMS) material and a (e.g. non-fluorinated) organic polymeric binder. In typical embodiments, a major amount of non-fluorinated polymeric binder is combined with a sufficient amount of siloxane (e.g. PDMS) material that provides the desired repellency properties, as described herein.

In typical embodiments, the amount of siloxane (e.g. PDMS) material is at least about 0.05, 0.1, 0.25, 0.5, 1.5, 2.0 or 2.5 wt.-% and in some embodiments, at least about 3.0, 3.5, 4.0, 4.5 or 5 wt.-%. The amount of siloxane (e.g. PDMS) material is typically no greater than 50, 45, 40, 35, 30, 25, 20, 15, or 10 wt.-% of the sum of the siloxane (e.g. PDMS) material and non-fluorinated polymeric binder.

In other embodiments, the (e.g. paint) liquid repellent surface comprises a siloxane (e.g. PDMS) material. In some embodiments, the siloxane (e.g. PDMS) material is a solid rather than a liquid (e.g. lubricant) at 25° C. and at temperatures ranging from 40° F. (4.44° C.) to 130° F. (54.4° C.). In typical embodiments the siloxane (e.g. PDMS) material is free of fluorinated groups and thus free of fluorine atoms. However, in other embodiments, a predominantly siloxane (e.g. PDMS) material may further comprise one or more fluorinated groups. Although it is most common to utilize a siloxane (e.g. PDMS) material, combinations of a fluorochemical material and a siloxane (e.g. PDMS) material can be utilized.

In some embodiments, a major amount of non-fluorinated polymeric binder or thermally processible polymer is combined with a sufficient amount of siloxane (e.g. PDMS) material that provides the desired repellency properties, as described herein.

In some embodiments, the silicone material is a compound, oligomer or polymer having a polysiloxane backbone and more typically a polydimethylsiloxane backbone. The polysiloxane backbone may further comprise pendent groups, such as hydrocarbon (e.g. preferably alkyl) groups. Such pendent groups contain more than one carbon atoms. The silicone material typically does not comprise vinyl groups or other polymerizable groups that would result in the silicone material forming a crosslinked network.

In some embodiments, the siloxane (e.g. PDMS) material (e.g. oligomer or polymer) comprises at least 50, 55, 60, 65, 70, 75, 80, 85, 90 or 95 wt.-% polydimethylsiloxane backbone. The siloxane (e.g. PDMS) material may further comprise pendent longer chain hydrocarbon (e.g. preferably alkyl) groups in an amount of at least 5, 10, 15, 20, 25, 30, or 35 wt.-% of the siloxane (e.g. PDMS) material.

The siloxane (e.g. PDMS) oligomer may have a molecular weight (Mn) of at least 1500 or 2000 g/mole as measured by GPC. The siloxane oligomer typically has a molecular weight (Mn) no greater than 10,000, 9000, 8000, or 7000 g/mole. The siloxane (e.g. PDMS) polymer typically has a molecular weight (Mn) greater than 10,000; 15,000; or 20,000 g/mole. In some embodiments, the molecular weight of the siloxane polymer is no greater than 100,000; 75,000; or 50,000 g/mole.

In some embodiments, the siloxane (e.g. PDMS) material comprises pendent longer chain hydrocarbon (e.g. preferably alkyl) groups wherein the longer chain hydrocarbon (e.g. preferably alkyl) groups average at least 8, 10, 12, 14, 16, 18, or 20 carbon atoms. In some embodiments, the siloxane (e.g. PDMS) material comprises pendent longer chain hydrocarbon (e.g. preferably alkyl) groups wherein the longer chain hydrocarbon (e.g. preferably alkyl) groups average greater than 20 carbons atoms such as at least 25, 30, 35, or 40. The pendent longer chain hydrocarbon (e.g. preferably alkyl) groups typically average no greater than 75, 70, 65, 60, or 50 carbon atoms.

In some embodiments, the siloxane (e.g. PDMS) material may be characterized as an alkyl dimethicone. The alkyl dimethicone comprises at least one linear, branched, or cyclic alkyl group averaging at least 8, 10, or 12 carbon atoms such as lauryl dimethicone, depicted as follows:

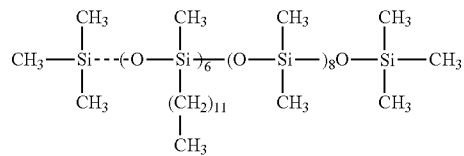

In some embodiments, the alkyl dimethicone comprises at least one linear, branched, or cyclic alkyl group averaging at least 14, 16, or 18 carbon atoms such as cetyl dimethicone and stearyl dimethicone.

These materials are characterized by having a (e.g. linear) polysiloxane backbone having terminal alkyl (C1-C4, typically methyl) silane groups and a pendent (e.g. linear) alkyl group.

Preferred alkyl dimethicones typically have the structure:

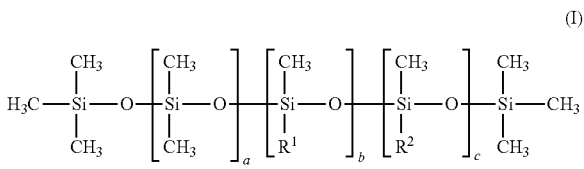

wherein the sum of (a+b+c) is between about 100 and 1000, for example between about 200 and 500 or between about 300 and 400; the ratio of a to the sum of (b+c) is about 99.9:0.1 to 80:20, or about 99:1 to 85:15, or about 99:1 to 90:10, or about 99:1 to 92:8, or about 98:2 to 93:7 or about or about 98:2 to 94:6; $R^1$ is a linear, branched, or cyclic alkyl group having between 20 and 50 carbon atoms, for example about 22 to 46 carbon atoms, or about 24 to 40 carbon atoms;

$R^2$ is a linear, branched, or cyclic alkyl or alkaryl group having between 2 and 16 carbons, for example about 4 to 16, or about 5 to 12, or about 6, to 10, or about 8 carbon atoms; and the structure is a random, block, or blocky structure. In some embodiments, the ratio of a to (b+c) in conjunction with the number of carbons in the $R^1$ and $R^2$ groups result in an alkyl dimethicones having greater than about 50 wt. % dimethyl siloxane (a) units, or in embodiments greater than about 60 wt. % dimethyl siloxane units. In some embodiments, c is 0. In some embodiments, the sum of (a+b+c) is about 300 to 400 and the ratio of "a" to the sum of (b+c) is about 98:2 to 94:6. In some embodiments, the alkyl dimethicone is a blend of two or more species thereof, wherein the species differ in terms of the sum of (a+b+c), the ratio of "a" to the sum of (b+c), the value of c, or in two or more such parameters. In some embodiments, the alkyl dimethicone is a random structure. In some embodiments, $R^1$ is a linear alkyl group. In some embodiments, $R^2$ is a linear alkyl group.

The alkyl dimethicone materials of the Formula I above are characterized by having a (e.g. linear) polysiloxane backbone having terminal alkyl (C1-C4, typically methyl) silane groups and a plurality of pendent (e.g. linear) alkyl groups.

Methods of synthesizing alkyl dimethicones are known in the art. See for example U.S. Pat. No. 9,187,678; incorporated (entirely) herein by reference.

While the structures of alkyl dimethicones are generally preferably linear structures, it will be understood by those of skill that such structures as synthesized or purchased can include an (e.g. small) amount of branching. Such branching, using terminology understood by those of skill, is referred to as "T" and "Q" functionality. In any of the embodiments herein, a substantially linear alkyl dimethicone structure can contain an amount of T branching, Q branching, or both.

In some embodiments, the siloxane (e.g. alkyl dimethicone) material has a melting temperature (e.g. peak endotherm as measured by DSC) of at least 140° F. (60° C.) or 150° F. (65.6° C.) ranging up to 170° F. (76.7° C.), 175° F. (79.4° C.), or 180° F. (82.2° C.).

In some embodiments, the siloxane (e.g. PDMS) material may be characterized as a high molecular weight or ultra high molecular weight (UHMW) polydimethylsiloxane (e.g. melt additive). In some embodiments, the siloxane (e.g. PDMS) material has a viscosity of at least 10,000 centistokes; 25,000 centistokes; or 50,000 centistokes ranging up to 100,000 centistokes. In other embodiments, the siloxane (e.g. PDMS) material has a viscosity at 25° C. greater than 100,000 centistokes. The viscosity may be at least 250,000 centistokes; 500,000 centistokes; 1,000,000 centistokes; or 5,000,000 centistokes; and typically less than 10,000,000 centistokes. In yet other embodiments, the siloxane (e.g. PDMS) material may be characterized as an ultra high molecular weight (UHMW) siloxane (e.g. PDMS) material having a viscosity greater than 10 million centistokes ranging up to 50 million centistokes.

The high and ultra high molecular weight siloxane (e.g. PDMS) material typically comprises little or no material having a viscosity less than 10,000 centistokes, or less than 5,000 centistokes, or less than 2500 centistokes, or less than 1000 centistokes. The ultra high molecular weight (UHMW) siloxane (e.g. PDMS) material typically comprises little or no material having a viscosity within the 10,000 centistokes to 100,000 centistokes. Further, the ultra high molecular weight (UHMW) siloxane (e.g. PDMS) material typically comprises little or no material having a viscosity within the 100,000 centistokes to 1,000,000 centistokes. When the siloxane material comprises little or no siloxane (e.g. PDMS) material of certain viscosities, the amount is less than 5, 4, 3, 2, 1, 0.5 or 0.1 wt.-% based on the total weight of the siloxane (e.g. PDMS) material. Unless specified otherwise, the viscosity values described herein refer to those measured at a temperature of 25° C. and a shear rate of 1 $sec^{-1}$.

Siloxane material melt additives often comprise a polydimethylsiloxane backbone. Some of the methyl groups can be substituted with functional groups to adjust the compatibility and mobility within the thermally processible polymer. Addition-reaction silicone elastomers, such as poly-vinyl siloxane (i.e. vinyl polysiloxane) are a viscous liquid that cure (i.e. chemically crosslink vinyl or other reactive groups) into a rubber-like solid, taking the shape or profile of the surface it is in contact with while curing. Such materials may be characterized as thermosets. Unlike addition-reaction silicone elastomers, in some embodiments the siloxane (e.g. PDMS) material melt additives are not chemically crosslinked and generally do not contain appreciable amounts of ethylenically unsaturated groups, such as vinyl groups or other reactive groups. In other embodiments, some of the PDMS may comprise dimethylvinyl terminal groups. Further, some of the PDMS may be hydroxyl terminated. The concentration of such ethylenically unsaturated groups (e.g. vinyl) or other reactive groups is typically sufficiently low such that the siloxane material is a thermoplastic material and/or suitable for thermally processing after chemical crosslinking of such groups.

In some embodiments, the siloxane (e.g. PDMS) material melt additives are commercially available preblended with a thermally processible polymer as a "masterbatch". For example, ultra high molecular weight (UHMW) polydimethylsiloxane, having a siloxane content of 50% is available predispersed in low density polyethylene (LDPE), melt flow index 8, from Dow Corning™ under the trade designation "MB50-002 Masterbatch". In some embodiments the LDPE may also contain silica (e.g. talc). Although the masterbatch is a solid material typically in the form of pellets or a powder, according to literature the siloxane (e.g. PDMS) material contained therein flows like a molten polymer, yet can have a higher molecular weight than silicone oils typically utilized as lubricants of a lubricant impregnated surface.

The article (e.g. component of the spray application system) is preferably prepared in a manner such that the siloxane (e.g. PDMS) material melt additive sufficiently separates from the thermally processible polymer it is admixed with and migrates to the surface of the article (e.g. component). When the separation or migration of siloxane (e.g. PDMS) material melt additive is insufficient, a liquid (e.g. paint) repellent surface, as described herein, is not obtained. An insufficient concentration of siloxane (e.g. PDMS) material melt additive can also result in not obtaining a liquid (e.g. paint) repellent surface. In some embodiments, the article (e.g. component) or liquid (e.g. paint) repellent surface may be subjected to a heat treatment to facilitate the separation of the siloxane (e.g. PDMS) material melt additive from the bulk of the thermally processible polymer. Such heat treatment may occur for example, when a liner is thermoformed from a sheet prepared by extrusion, the liner may have better liquid (e.g. paint) repellency than the sheet from which it was prepared.

In some embodiments, the siloxane material may be characterized as a siloxane copolymer or silicone-containing copolymer. The above described alkyl dimethicone is one class of siloxane copolymer. However, other classes of siloxane copolymers are also suitable.

Siloxane copolymers are generally prepared using methods such as living anionic polymerization, ring-opening polymerization (ROP), atom transfer radical polymerization (ATRP), and step-growth polymerization. Siloxane copolymers may be characterized for example as grafted, segmented, or block copolymers. The block copolymers, can have various structures, most commonly a diblock or triblock structure.

Although the most common siloxane polymer backbone is polydimethylsiloxane (PDMS), the backbone of the siloxane polymer may include other substituents or polymerized units derived from other monomers, especially non-reactive polymerized units such a methyl phenyl siloxane, diphenyl siloxane, or 3,3,3-trifluoropropylmethyl siloxane, and combinations thereof.

The polydiorganosiloxane ("polysiloxane") backbone comprises repeating unit of the formula:

(II)

wherein each R is independently a $C_{1-13}$ monovalent organic group. For example, R can be a $C_1$-$C_{13}$ alkyl, $C_1$-$C_{13}$ alkoxy, $C_2$-$C_{13}$ alkenyl group, $C_2$-$C_{13}$ alkenyloxy, $C_3$-$C_6$ cycloalkyl, $C_3$-$C_6$ cycloalkoxy, $C_6$-$C_{14}$ aryl, $C_6$-$C_{10}$ aryloxy, $C_7$-$C_{13}$ arylalkyl, $C_7$-$C_{13}$ aralkoxy, $C_7$-$C_{13}$ alkylaryl, or $C_7$-$C_{13}$ alkylaryloxy. In an embodiment, where a transparent polysiloxane-polycarbonate is desired, R is preferably unsubstituted by halogen. Combinations of the foregoing R groups can be used in the same copolymer.

The value of E in the above formula can vary. Generally, E has an average value of at least 2, 5, or 10 and in some embodiments at least 15, 20, 25, 30, 35, or 40. In typical embodiments E has an average value up to 1,000. In some embodiments, E is no greater than 900, 800, 700, 600 500, 400, 300, 200, or 100. In some embodiments, E is no greater than 90, 80, 70, or 60.

In some embodiments, the siloxane copolymer comprises 50, 55, 60, 65, 70, 75, 80, 85, 90 or 95 wt.-% of polyorganosiloxane (e.g. PDMS) material, such as in the case of the previously described alkyl dimethicone. In other embodiments, the siloxane copolymer comprises less than 50 wt.-% polyorganosiloxane (e.g. PDMS) material. In some embodiments, the siloxane copolymer comprises at least 1, 1.5, 2, 2.5, 3, 3.5, 4, 4.5 or 5 wt.-% of polyorganosiloxane (e.g. PDMS) material. In other embodiments, the siloxane copolymer comprises at least 10, 15, 20, 25, or 30 wt.-% of polyorganosiloxane (e.g. PDMS) material.

Although in the case of the alkyl dimethicone copolymer depicted above, the alkyl group is bonded directly to a silicone atom of a siloxane backbone, when the siloxane copolymer is prepared from other synthetic routes the silicone copolymer may further comprise other groups within the copolymer. In such embodiments, the silicone copolymer may be characterized as a silicone urea copolymer, silicone-urethane copolymer, silicone-ester copolymer, silicone amide copolymer, silicone imide copolymer, etc.

The comonomer of the siloxane copolymer can be selected based on the composition of the article (e.g. component of the spray application system) and/or based on the intended method of making the article (e.g. component) or repellent surface thereof.

For example when the article (e.g. component of the spray application system) is a thermally processible material such as a polyolefin (e.g., LDPE) and the repellent surface is prepared by use of a siloxane material melt additive, the siloxane copolymer melt additive may be an alkyl dimethicone copolymer or a copolymer of polyolefin and polyorganosiloxane (e.g. PDMS). Other siloxane copolymers that include polyolefin are various block copolymers such as described in U.S. Pat. Nos. 5,618,903; 5,641,835 and 5,728,469; incorporated herein by reference. As yet another example, when the article (e.g. component of the spray application system) comprises polycarbonate, the siloxane copolymer melt additive may be a polycarbonate siloxane copolymer.

Depending on the selection of the comonomer, the siloxane (e.g. copolymer) material may have a higher melting point or higher softening point than the alkyl dimethicone copolymer depicted above. For example, in some embodiments, the Vicat Softening Temperature (ASTM D 1525, Rate A/50) of the (e.g. polycarbonate) siloxane copolymer is at least 150° F. (65.6° C.), 200° F. (93.3° C.) or 250° F. (121.1° C.) ranging up to 275° F. (135° C.) or 300° F. (148.9° C.). Highly crosslinked (e.g. thermoset) siloxane materials generally do have a softening temperature in the ranges just described.

In one embodiment, the polycarbonate siloxane copolymer comprises structural units of the formula:

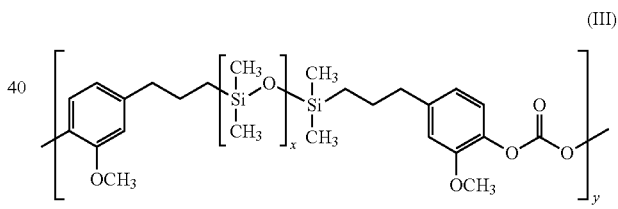

(III)

where x and y are integers representing the number of repeating units; and x is at least one.

Such structural units may be characterized as the A block of a block copolymer.

The polycarbonate siloxane copolymer further comprises polycarbonate structural units. In typical embodiments, the polycarbonate structural unit has the formula:

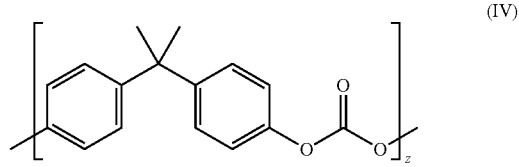

(IV)

Such structural units may be characterized as the B block of a block copolymer. Other aromatic polycarbonate structural units are depicted as follows:

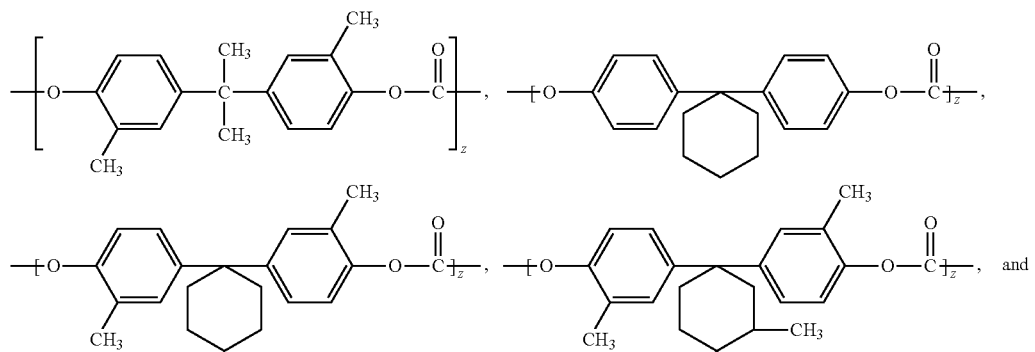

In one embodiment, the siloxane copolymer comprises structural units of the formula:

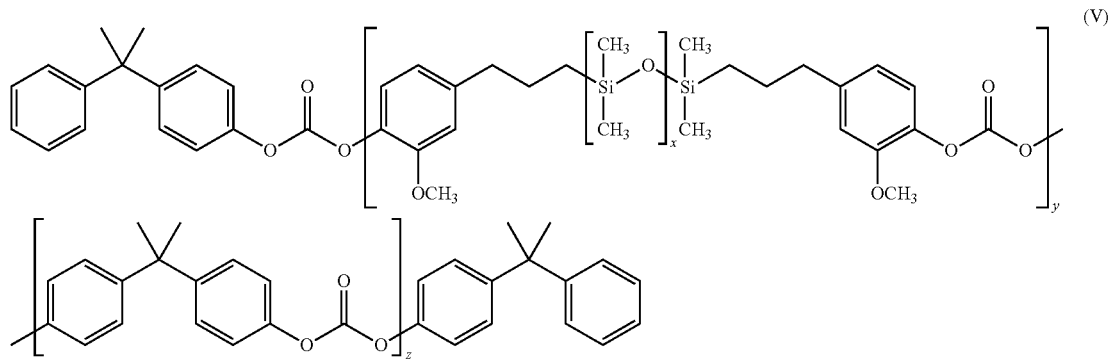

(V)

wherein x, y, and z of the polycarbonate siloxane copolymer or structural units thereof are integers representing the number of repeating units of the Formulas. The integer x is at least 1 and typically falls within the same range as E, as previously described. The integer y is at least one and typically less than 15 or 10. In some embodiments, z ranges from 50 to 400.

According to US2013/0186799, incorporated herein by reference, Formula V provides the structure of the polycarbonate (PC) siloxane resin LEXAN™ EXL 1414T resin.

Since the LEXAN™ copolymers are (e.g. transparent) thermally processible thermoplastic resins, such copolymers can be used to make liquid repellent articles (e.g. liquid reservoir, liner, lid, components of the spray application system) utilizing various thermal processing techniques such as injection molding and thermoforming.

In some embodiments, at least the repellent surface layer is prepared from a (e.g. transparent) siloxane copolymer having a melt flow rate of at least 2.5, 5 or 10 g/10 minutes at 300° C./1.2 kgf (ASTM D1238) and typically no greater than 30, 25 or 20 g/10 minutes. Mixtures of polycarbonate siloxane copolymers of different flow properties can be used to achieve the overall desired flow property. Highly cross-linked (e.g. thermoset) siloxane materials generally do have melt flow indexes in the ranges just described.

The tensile strength of the siloxane copolymer is typically at least 40, 45, 50, 55, or 60 MPa. Further, the siloxane copolymer can have a low elongation at break of less than 10% or 5%. In some embodiments, the siloxane copolymer has a tensile modulus of at least 1000, 1500, or 2000 MPa ranging up to 2500 MPa. The tensile and elongation properties can be measured according to ASTM D-638 (e.g. at a rate of 50 mm/min).

PDMS generally has a melting point of about −40° C. and a glass transition temperature (Tg) of about −125° C. Siloxane copolymers can have melting point and glass transition temperatures greater than 0° C. or greater than 25° C. In some embodiments, the siloxane copolymer has a melt temperature of at least 100° C., 150° C., 200° C., 250° C., or 300° C. and typically no greater than 350° C. or 400° C. In some embodiments, the siloxane copolymer has a Tg of at least 50° C., 75° C., 100° C., 125° C., or 150° C. and typically no greater than 175° C. or 200° C. Unless specified otherwise, thermal properties can be determined by Differential Scanning calorimetry (DSC).

In some embodiments, the repellent surface can be prepared by providing a repellent surface layer on an article (e.g. spray application system component, liquid reservoir, liner, lid) formed by application of an organic solvent-coating composition comprising siloxane material such as a polycarbonate-siloxane copolymer to an article (e.g. spray application system component).

Various organic polymeric binders can be utilized. Although fluorinated organic polymeric binders can also be utilized, fluorinated organic polymeric binders are typically considerably more expensive than non-fluorinated binders. Further, non-fluorinated organic polymeric binders can exhibit better adhesion to polymeric articles (e.g. reservoir, liner, lid, components of the spray application system).

Suitable non-fluorinated binders include for example polystyrene, atactic and syndiotactic polystyrene, acrylic (i.e. poly(meth)acrylate), polyester, polyurethane (including polyester type thermoplastic polyurethanes "TPU"), polyolefin (e.g. polyethylene), and polyvinyl chloride. Many of the polymeric materials that the article (e.g. reservoir, liner, lid, component of the spray application system) can be thermally processed from, as will subsequently be described, can be used as the non-fluorinated organic polymeric binder of an (e.g. organic solvent) coating composition. However, in typical embodiments, the non-fluorinated organic polymeric binder is a different material than the polymeric material of the article (e.g. component). In some embodiments, the organic polymeric binder typically has a receding contact angle with water of less than 90, 80, or 70 degrees. Thus, the binder is typically not a siloxane (e.g. PDMS) material.

In some embodiments, the (e.g. non-fluorinated) organic polymeric binder is a film-grade resin, having a relatively high molecular weight. Film-grade resins can be more durable and less soluble in an organic solvent that may be present in the liquid (e.g. paint) being repelled. In other embodiments, the (e.g. non-fluorinated) organic polymeric binder can be a lower molecular weight film-forming resin. Film-forming resins can be more compliant and less likely to affect the collapsibility of a liquid (e.g. paint) reservoir or liner. Viscosity and melt flow index are indicative of the molecular weight. Mixtures of (e.g. non-fluorinated) organic polymeric binder can also be used.

In some embodiments, the film-grade (e.g. non-fluorinated) organic polymeric binder typically has a melt flow index of at least 1, 1.5, 2, 2.5, 3, 4, or 5 g/10 min at 200° C./5 kg ranging up to 20, 25, or 30 g/10 min at 200° C./5 kg. The melt flow index can be determined according to ASTM D-1238. The tensile strength of the (e.g. non-fluorinated) organic polymeric binder is typically at least 40, 45, 50, 55, or 60 MPa. Further, the (e.g. non-fluorinated) organic polymeric binder can have a low elongation at break of less than 10% or 5%. The tensile and elongation properties can be measured according to ASTM D-638. Such film-grade (e.g. non-fluorinated) organic polymeric binders just described can also be suitable for use as a thermally processible polymer of the article (e.g. spray application system component, reservoir, liner, lid).

In other embodiments, the (e.g. non-fluorinated) organic polymeric binders have a lower molecular weight and lower tensile strength than film-grade polymers. In one embodiment, the melt viscosity of the (e.g. non-fluorinated) organic polymeric binders (as measured by ASTM D-1084-88) at 400° F. (204° C.) ranges from about 50,000 to 100,000 cps. In another embodiment, the molecular weight (Mw) of the (e.g. non-fluorinated) organic polymeric binder is typically at least about 1000, 2000, 3000, 4000, or 5000 g/mole ranging up to 10,000; 25,000; 50,000; 75,000; 100,000; 200,000; 300,000; 400,000, or 500,000 g/mole. In some embodiments, the (e.g. non-fluorinated) organic polymeric binder has a tensile strength of at least 5, 10, or 15 MPa ranging up to 25, 30 or 35 MPa. In other embodiments, the (e.g. non-fluorinated) organic polymeric binder has a tensile strength of at least 40, 45, or 50 MPa ranging up to 75 or 100 MPa. In some embodiments, the (e.g. non-fluorinated) organic polymeric binder has an elongation at break ranging up to 25, 50, 100, 200, 300, 400, 500, 600, 700, 800, 900 or 1000% or higher. In some embodiments, the (e.g. non-fluorinated) organic polymeric binder has a Shore A hardness of at least 50, 60, 70, or 80 ranging up to 100.

In some embodiments, the (e.g. non-fluorinated) organic polymeric binder is selected such that it is (e.g. mechanically) compliant at the use temperature of the coated substrate or article.

In this embodiment, the (e.g. non-fluorinated) organic polymeric binder has a glass transition temperature (Tg) as can be measured by DSC of less than 0° C. or 32° F. In some embodiments, the (e.g. non-fluorinated) organic polymeric binder has a glass transition temperature (Tg) of less than 20° F., 10° F., 0° F., −10° F., −20° F., −30° F., −40° F., −50° F., −60° F., −70° F., or −80° F. In some embodiments, the (e.g. non-fluorinated) organic polymeric binder has a Tg of at least −130° C. The selection of (e.g. non-fluorinated) organic polymeric binder can contribute to the durability of the repellent surface.

In typical embodiments, the non-fluorinated organic polymeric binder typically does not form a chemical (e.g. covalent) bond with the siloxane (e.g. PDMS) material as this may hinder the migration of the siloxane (e.g. PDMS) material to the outermost surface layer.

In some embodiments, the (e.g. non-fluorinated) organic polymeric binder is not curable, such as in the case of alkyd resins. An alkyd resin is a polyester modified by the addition of fatty acids and other components. They are derived from polyols and a dicarboxylic acid or carboxylic acid anhydride. Alkyds are the most common resin or "binder" of most commercial "oil-based" paints and coatings.

In some embodiments, the selection of the non-fluorinated polymeric binder can affect the concentration of siloxane (e.g. PDMS) material that provides the desired liquid (e.g. paint) repellency properties.

The siloxane (e.g. PDMS) polymers or compositions comprising a siloxane (e.g. PDMS) material and a non-fluorinated organic polymeric binder can be dissolved, suspended, or dispersed in a variety of organic solvents to form coating compositions suitable for use in coating the compositions onto a substrate or article (e.g. component of a spray application system). The organic coating compositions typically contain at least about 85%, 86%, 87%, 88%, 89%, 90%, 91%, 92%, 93%, 94%, 95%, 96%, 97%, 98%, 99% organic solvent or greater, based on the weight of the coating composition. The coating compositions typically contain at least about 0.01%, 0.1%, 0.5%, 1%, 2%, 3%, 4%, 5%, 6%, 7%, 8%, 9%, 10%, 15% or greater solids of (e.g. non-fluorinated) organic polymeric binder and siloxane (e.g. PDMS) material, based on the total weight of the coating composition. However, the coating composition can be provided as a concentrate with an even higher amount of solids, e.g. 20, 30, 40, or 50 wt.-% solids. Suitable solvents include for example alcohols, esters, glycol ethers, amides, ketones, hydrocarbons, chlorohydrocarbons, hydrofluorocarbons, hydrofluoroethers, chlorocarbons, and mixtures thereof. In some embodiments, the coating composition is an aqueous suspension, emulsion, or solution comprising at least 50 wt.-% or greater water and an organic cosolvent.

In one embodiment, the coating composition may contain 5 wt.-% of low density polyethylene binder (such as the NA217000 LDPE or Marflex 1122 LDPE described in the forthcoming examples) dissolved is 95 wt.-% or organic solvent, such as xylene, toluene, or dichloroethylene. The coating composition may further contain 3 wt.-% of siloxane material (such as SMA described in the forthcoming examples). Other concentrations of binder and siloxane material can be utilized provided the desired liquid repellency properties are attained.

The coating compositions may contain one or more additives provided the inclusion of such does not detract from the liquid (e.g. paint) repellent properties.

The coating compositions can be applied to a substrate or article (e.g. component) by standard methods such as, for example, spraying, padding, dipping, roll coating, brushing, or exhaustion (optionally followed by the drying of the treated substrate to remove any remaining water or organic solvent). The substrate can be in the form of sheet articles that can be subsequently thermally formed into a liquid (e.g. paint) reservoir, liner or lid. When coating flat substrates of appropriate size, knife-coating or bar-coating may be used to ensure uniform coatings of the substrate.

The moisture content of the organic coating composition is preferably less than 1000, 500, 250, 100, or 50 ppm. In some embodiments, the coating composition is applied to the substrate at a low relative humidity, e.g. of less than 40%, 30%, or 20% at 25° C.

The coating compositions can be applied at an amount sufficient to achieve the desired repellency properties. Coatings as thin as 250, 300, 350, 400, 450, or 500 nm ranging up to 1, 1.5, 2, 2.5, 3, 3.5, 4, 4.5 or 5 microns can provide the desired repellency. However, thicker coatings (e.g., up to about 10, 15, 20 microns or more) can also be used. Thicker coatings can be obtained by applying to the substrate a single thicker layer of a coating composition that contains a relatively high concentration of solids. Thicker coatings can also be obtained by applying successive layers to the substrate.

In another embodiment, the siloxane (e.g. PDMS) material can be combined with a thermally processible (e.g. thermoplastic) polymer and then melt processed into a surface layer, substrate, or article (e.g. component) such as a liquid (e.g. paint) repellent reservoir, liner or lid. In this embodiment, the siloxane (e.g. PDMS) material typically migrates to the surface forming a surface layer with a high concentration of siloxane material relative to the total amount of siloxane material and thermally processible polymer.

In typical embodiments, the amount of siloxane (e.g. PDMS) material (melt additive) is at least about 0.05, 0.1, 0.25, 0.5, 1.5, 2.0 or 2.5 wt.-% and in some embodiments, at least about 3.0, 3.5, 4.0, 4.5 or 5 wt.-%. The amount of siloxane material is typically no greater than 25, 20, 15, or 10 wt.-% of the sum of the siloxane (e.g. PDMS) material (melt additive) and thermally processible polymer.

To form a polymer blend by melt processing, the siloxane material can be, for example, mixed with pelletized, granular, powdered or other forms of the thermally processible polymer and then melt processed by known methods such as, for example, molding or melt extrusion. The siloxane (e.g. PDMS) material can be mixed directly with the thermally processible polymer or it can be mixed with the (thermally processible) polymer in the form of a "master batch" (concentrate) of the siloxane (e.g. PDMS) material in the (same or similar) polymer as the thermally processible polymer. If desired, an organic solution of the siloxane (e.g. PDMS) material can be mixed with powdered or pelletized polymer, followed by drying (to remove solvent) and then melt processing. Alternatively, the siloxane (e.g. PDMS) composition can be added to the polymer melt to form a mixture or injected into a molten polymer stream to form a blend immediately prior to extrusion or molding into articles.

In some embodiments, the melt processible (e.g. thermoplastic) polymer is a polyolefin, polyester, polyamide, polyurethane, polycarbonate, polystyrene, poly(alkyl acrylate), or polyacrylate. The thermoplastic polymer preferably is a polyolefin, mixture or blend of one or more polyolefins, a polyolefin copolymer, mixture of polyolefin copolymers, or a mixture of at least one polyolefin and at least one polyolefin copolymer.

The thermoplastic polymer is more preferably a polyolefin polymer or copolymer wherein the polymer unit or copolymer unit is ethylene, propylene, butylene, hexene or mixtures thereof. Thus the polyolefin is preferably polypropylene, polyethylene, polybutylene, polyhexylene or a blend or copolymer thereof. Other polyolefins include poly-α-olefins, and copolymers thereof, including low density polyethylene (LDPE), high density polyethylene (HDPE), linear low density polyethylene (LLDPE), ultra-high density polyethylene (UHDPE), and polyethylene-polypropylene copolymers, as well as polyolefin copolymers having non-olefin content (that is, content derived from monomers that are not olefins). The non-olefin content of polyolefin polymers employed in some embodiments is not particularly limited, but includes, for example, 1-5 wt % of acrylic acid, or methacrylic acid functionality, including sodium, zinc, or calcium salts of the acid functionality; 1-5 wt % of an anhydride functionality, such as maleic anhydride, or the corresponding ring-opened carboxylate functionality; and the like. In some embodiments, blends of polyolefins containing non-polyolefin content are blended at various ratios with polyolefins in order to provide a targeted level of non-olefin content.

In one embodiment, the thermoplastic polymer is polyethylene having a melting point ranging from 90-140° C. such as available from Chevron Phillips under the trade designation "MarFlex 1122 Polyethylene".

The siloxane melt additives are generally a solid at room temperature (e.g. 25° C.) and at the use temperature of the article (e.g. spray application system component), which commonly ranges from 40° F. to 120° F. The siloxane (e.g. PDMS) material and thermally processible polymer are selected such that the siloxane material is typically molten at the melt processing temperature of the mixture. In some embodiments, the siloxane material has a melt temperature no greater than 200, 190, 180, 170, or 160° C. In other embodiments, the melt temperature may be higher.

The melt processible polymer of the repellent surface and/or article (e.g. spray application component, reservoir, liner, lid) may further contain non-siloxane slip agents, anti-blocks (e.g. silica, talc) antioxidants, tints, antistatic agents, light stabilizers, clarifiers (e.g. polypropylene), nucleating agents, and other additives known in the art. Clarifiers typically increase the clarity by reducing the size of the spherulites. Smaller spherulites allow more light through the polymer, which decreases the haze of the part. Unlike nucleating agents, clarifiers are transparent, which also helps to decrease haze values.

Extrusion can be used to form polymeric films. In film applications, a film forming polymer is simultaneously melted and mixed as it is conveyed through the extruder by a rotating screw or screws and then is forced out through a slot or flat die, for example, where the film is quenched by a variety of techniques known to those skilled in the art. The films optionally are oriented (after being cast) prior to quenching by drawing or stretching the film at elevated temperatures in the machine and/or transverse directions simultaneously or sequentially.

Molded articles are produced by pressing or by injecting molten polymer from a melt extruder as described above into a mold where the polymer solidifies. Typical melt forming techniques include injection molding, blow molding, compression molding and extrusion, and are well known to those skilled in the art. The molded article is then ejected from the mold and optionally heat-treated to effect migration of the polymer additives to the surface of the article.

In some embodiments, a molded article (e.g. component) with a liquid-repellent surface may be made using molding processes (e.g. co-injection molding or bi-injection molding) in which two different resins are injected into a mold through the same gate or different gates to form an integral liquid-repellent skin layer over a core layer in a single molding process. For example, the first of the two resins could be a polyolefin, and the second of the two resins could be a polyolefin to which a neat melt additive or melt additive masterbatch has been added.

After melt processing, an annealing step can be carried out to enhance the development of repellent characteristics. The annealing step typically is conducted below or above the melt temperature of the polymer for a sufficient period of time. The annealing step can be optional.

The repellent surface layer described herein can be provided on a wide variety of organic or inorganic articles (e.g. components).

In some embodiments, different articles (e.g. components) are coated with different solid materials. In other embodiments, the surface of one portion of an article (e.g. component) can comprise one type of a solid liquid (e.g. paint) repellent material and another surface portion can comprise a different type of solid material. Likewise, the surface of one portion of an article (e.g. component) can comprise one type of a solid liquid (e.g. paint) repellent material and another surface portion can comprise a different liquid (e.g. paint) repellent material.

In typical embodiments, the entire surface of the article (e.g. reservoir, liner, lid, component of the spray application system) that normally comes in contact with a liquid (e.g. paint) comprises a liquid (e.g. paint) repellent surface as described herein. In other embodiments, only a portion of the surface of the article (e.g. reservoir, liner, lid, component of the spray application system) that normally comes in contact with a liquid (e.g. paint) comprises a liquid (e.g. paint) repellent surface as described herein. This latter embodiment is still beneficial relative to articles (e.g. components) lacking a liquid (e.g. paint) repellent surface.

Suitable polymeric materials for articles (e.g. components) include, but are not limited to, polyesters (e.g., polyethylene terephthalate or polybutylene terephthalate), polycarbonates, acrylonitrile butadiene styrene (ABS) copolymers, poly(meth)acrylates (e.g., polymethylmethacrylate, or copolymers of various (meth)acrylates), polystyrenes, polysulfones, polyether sulfones, epoxy polymers (e.g., homopolymers or epoxy addition polymers with polydiamines or polydithiols), polyolefins (e.g., polyethylene and copolymers thereof or polypropylene and copolymers thereof), polyvinyl chlorides, polyurethanes, fluorinated polymers, cellulosic materials, derivatives thereof, and the like.

In some embodiments, where increased transmissivity is desired, the polymeric article (e.g. component) can be transparent. The term "transparent" means transmitting at least 85 percent, at least 90 percent, or at least 95 percent of incident light in the visible spectrum (wavelengths in the range of 400 to 700 nanometers). Transparent articles (e.g. components) may be colored or colorless.

Suitable inorganic substrates include metals and siliceous materials such as glass. Suitable metals include, for example, pure metals, metal alloys, metal oxides, and other metal compounds. Examples of metals include, but are not limited to, chromium, iron, aluminum, silver, gold, copper, nickel, zinc, cobalt, tin, steel (e.g., stainless steel or carbon steel), brass, oxides thereof, alloys thereof, and mixtures thereof.

The siloxane materials described herein can render the coated surface hydrophobic. The terms "hydrophobic" and "hydrophobicity" refer to a surface on which drops of water or aqueous liquid exhibit an advancing and/or receding water contact angle of at least 50 degrees, at least 60 degrees, at least 70 degrees, at least 80 degrees, at least 90 degrees, at least 95 degrees, or at least 100 degrees.

In some embodiments, the advancing and/or receding contact angle of the repellent surface of the substrate or article (e.g. component) with water may increase, relative to the substrate or article (e.g. component) lacking a liquid (e.g. paint) repellent surface, by at least 10, 15, 20, 25, 30, 35, 40 degrees. In some embodiments, the receding contact angle with water may increase by at least 45, 50, 55, 60, or 65 degrees.

In some embodiments, the (e.g. siloxane) materials described herein, provide a surface that exhibits an advancing and/or receding contact angle with water of at least 105, 110, or 115 degrees. The advancing and/or receding contact angle with water is typically no greater than 135, 134, 133, 132, 131, or 130 degrees and in some embodiments, no greater than 129, 128, 127, 126, 125, 124, 123, 122, 121, or 120 degrees. The difference between the advancing and/or receding contact angles (contact angle hysteresis ("CAH")) with water of the liquid repellent surface layer can be at least 5, 10, 15, 20, 25, 30, 35, 40, 45, or 50 degrees. Favorably the difference between the advancing and receding contact angle with water of the surface treated hydrophobic lubricant impregnated porous surface, as well as the other (e.g. solid) materials described herein is no greater than 15, 14, 13, 12, 11, 10, 9, 8, 7, 6, 5, 4, 3, 2, or 1 degree. As the difference between the advancing and/or receding contact angle with water increases, the tilt angle needed to slide or roll off a (e.g. water or paint) droplet from a planar surface increases. One of ordinary skill appreciates that deionized water is utilized when determining contact angles with water.

The contact angle of the liquid (e.g. paint) repellent surface of the substrate or article (e.g. component) can also be evaluated with other liquids instead of water. For example, since paints, such as water-based automobile paints, often comprise 2-n-butoxyethanol, the contact angle of the liquid (e.g. paint) repellent surface with a solution of 10% by weight 2-n-butoxyethanol and 90% by weight deionized water can also be of importance. In some embodiments, the advancing contact angle with such 2-n-butoxyethanol solution is at least 45, 46, 47, 48, 49, 50, 51, 52, 53, 54, 55, 56, 57, 58, 59, 60, 61, 62, 63, 64, 65, 66, 67, 68, 69, 70 degrees and in some embodiments at least 75 or 80 degrees. In some embodiments, the receding contact angle with such 2-n-butoxyethanol solution is at least 35, 36, 37, 38, 39, 40, 41, 42, 43, 44, 45, 46, 47, 48, 49, 50, 55, 60, 65, or 70 degrees. In some embodiments, the advancing and/or receding contact angle of the liquid (e.g. paint) repellent surface of the substrate or article (e.g. component) with a solution of 10% by weight 2-n-butoxyethanol and 90% by weight deionized water is no greater than 100, 95, 90, 85, 80, or 75 degrees.

In another embodiment, the contact angle of the liquid (e.g. paint) repellent surface of the substrate or article (e.g. component) with hexadecane is at least 45, 46, 47, 48, 49, 50, 55, 60, 65, 70, or 75 degrees. The advancing contact angle with hexadecane is typically at least 45, 50, 55, 60, 65, 70, 75, 80, or 84 degrees. In typical embodiments, the receding or advancing contact angle with hexadecane is no greater than 85 or 80 degrees.

The (e.g. siloxane) materials described herein can be used to impart or enhance (e.g. aqueous) liquid repellency of a variety of substrates and articles.

The term "aqueous" means a liquid medium that contains at least 50, 55, 60, 65, or 70 wt-% of water. The liquid medium may contain a higher amount of water such as at least 75, 80, 85, 90, 95, 96, 97, 98, 99, or 100 wt.-% water. The liquid medium may comprise a mixture of water and one or more water-soluble organic cosolvent(s), in amounts such that the aqueous liquid medium forms a single phase. Examples of water-soluble organic cosolvents include for example methanol, ethanol, isopropanol, 2-methoxyethanol, (2-methoxymethylethoxy)propanol, 3-methoxypropanol, 1-methoxy-2-propanol, 2-butoxyethanol, ethylene glycol, ethylene glycol mono-2-ethylhexylether, tetrahydrofuran, 2,2,4-trimethyl-1,3-pentanediol monoisobutyrate, tetraethylene glycol di(2-ethylhexoate), 2-ethylhexylbenzoate, and ketone or ester solvents. The amount of organic cosolvent does not exceed 50 wt-% of the total liquids of the coating composition. In some embodiments, the amount of organic cosolvent does not exceed 45, 40, 35, 30, 25, 20, 15, 10 or 5 wt.-% organic cosolvent. Thus, the term aqueous includes (e.g. distilled) water as well as water-based solutions and dispersions such as paint.

In some embodiments, the aqueous (e.g. paint) "ready to spray" dispersions, e.g. paint, described herein may comprise at least 5, 10, or 15 wt.-% solids with the remainder being aqueous liquid medium. In some embodiments, the aqueous (e.g. paint) "ready to spray" dispersions, e.g. paint, described herein may comprise at least 20, 25, 30, or 35 wt.-% solids with the remainder being aqueous liquid medium. Further, in some embodiments, the aqueous (e.g. paint) dispersions may be a concentrate comprising at least 40, 45, 50, 55, 60, 65, 70, 75, 80, or 85 wt.-% solids with the remainder being aqueous liquid medium. Such concentrates are generally diluted to prepare an aqueous (e.g. paint) "ready to spray" dispersion.

In some embodiments, the (e.g. solid) materials described herein can impart a degree of aqueous liquid repellency such that no greater than 40%, 35%, 30%, 25%, 20%, 15%, 10%, 5%, or 1% of the repellent surface area comprises an aqueous test liquid, such as paint, after use of the spray application system or after holding the repellent surface vertically for a specified duration of time (e.g. 30 seconds-5 minutes or 30 minutes) and visually determining (in the absence of a microscope) the amount of aqueous liquid (e.g. paint). In some embodiments, polypropylene glycol (400 Mw), butoxyethanol, or a 50 wt. % aqueous solution of butoxyethanol can be used as a test liquid.

In some embodiments, the porous layer impregnated lubricant, as well as the other (e.g. solid) materials described herein can impart a degree of liquid repellency such that the mass of retained aqueous liquid (e.g. paint) is no greater than 0.01 g/cm$^2$, 0.005 g/cm$^2$, 0.001 g/cm$^2$, or 0.0005 g/cm$^2$. In some embodiments, polypropylene glycol (400 Mw), butoxyethanol, or a 50 wt. % aqueous solution of butoxyethanol can be used as a test liquid.

The paint repellency can be evaluated according to any one or combination of test methods described herein utilizing a test paint. Various aqueous-based automotive paints were found to be repelled by the surfaces described herein such as PPG ENVIROBASE HIGH PERFORMANCE T409, SIKKENS AUTOWAVE, SPIES HECKER PERMAHYD HI-TEC BASE COAT 480, and GLASURIT ADJUSTING BASE 93-E3. Unless specified otherwise, the test paint for determining paint repellency according to the test methods described herein was PPG Envirobase automobile paint mixed to specification containing 90 weight % ENVIROBASE HIGH PERFORMANCE T409 DEEP BLACK and 10 weight % ENVIROBASE HIGH PERFORMANCE T494 PAINT THINNER, available from PPG Industries, Pittsburgh Pa. or available from 3M, St. Paul, Minn.

The liquid (e.g. paint) repellent surface is preferably durable such that the liquid (e.g. paint) repellency is retained for a sufficient amount of time (e.g. the normal duration of time a (e.g. disposable) liquid (e.g. paint) reservoir or liner is utilized). In some embodiments, the liquid (e.g. paint) repellency is retained after surface abrasion testing (according to the test method described in the examples). In some embodiments, the liquid (e.g. paint) repellency may diminish to some extent, yet remains highly repellent after surface abrasion testing. Thus, after surface abrasion testing the contact angles or paint repellency meet(s) the criteria previously described.

The spray application system described herein can be utilized to apply an aqueous liquid mixture, such as paint.

As used herein, the term "paint" refers to a composition having an aqueous liquid medium, as previously described, and a polymeric (e.g. latex) binder dispersed in the aqueous liquid medium. Common polymeric binders utilized in paint include acrylic polymers, alkyd polymers, urethane polymers, epoxy polymers, and combinations thereof. In some embodiments, the (e.g. base coat) paint may comprise a combination of acrylic and alkyd polymers. In other embodiments, the (e.g. clear coat) paint may comprise hexamethylene isocyanate oligomers and/or cyclohexyl isocyanate oligomers at concentrations ranging from about 20 to 40 wt-% for "ready to spray" compositions.

In the absence of opacifying pigment(s), such as titanium dioxide, silica, carbon black, etc. or other colorant (i.e. pigment or dye other than black or white) the paint may be characterized as a "clear coat". Paints that further comprise opacifying pigment(s), yet not colored pigments may be characterized as primers. Further, paints that further comprise both opacifying pigment(s) and colorant(s) may be characterized as base coats.

Whereas clear coats are generally free of opacifying pigments and colorants, primers and base coats typically comprise at least 10, 15, 20, 25 or 30 wt.-% or greater of opacifying pigment(s) such as titanium dioxide. Base coats further comprise colorants at various concentrations. In some embodiments, the paint comprises 5 to 25 wt.-% of colorants.

The liquid medium may comprise relatively small concentrations of volatile organic solvents. For example, the volatile organic content of water-based flat architectural paint, water-based automobile primer, and water-based clear coat is typically no greater than 250 grams/liter and in some embodiments no greater than 200 grams/liter, 150 grams/liter, 100 grams/liter, or 50 grams/liter. The VOC content may be higher, ranging from at least 275, 300, or 325 grams/liter up to 500 grams/liter, particularly for automobile base coat. In some embodiments, the VOC content is no greater than 450 or 425 grams/liter. Paint referred to as no-VOC typically may contain 5 grams/liter or less of volatile organic solvents. As used herein, VOC is any organic compound having a boiling point less than or equal to 250° C. measured at a standard atmospheric pressure of 101.3 kPa.

As the concentration of colored pigment(s) increases, the concentration of (e.g. volatile) organic solvents present for the purpose of dissolving and dispersing such colored pigment(s) can also increase. Further, (e.g. volatile) organic solvents can also be utilized to lower the viscosity of the paint. Viscosity will vary with the thinner level chosen. However, in some embodiments, the viscosity of the "ready to spray" paint at 20° C. ranges from 50 to 100 cps.

The paint may comprise water-soluble organic solvents such as alcohols (e.g. alkylene glycol alkyl ether). For example, the paint may comprise 2-butoxyethanol (ethylene glycol monobutyl ether), having a boiling point of 171° C. (340° F.); butoxypropan-2-ol (propylene glycol n-butyl ether), having a boiling point of 171° C. (340° F.); 2-(2-butoxyethoxy)ethanol (diethylene glycol monobutyl ether), having a boiling point of 230° C. (446° F.); and combinations thereof. The paint may comprise one or more of such alcohols at a total concentration of at least 5 wt.-% ranging up to 10, 15, 20, or 25 wt.-%.

The paint may further comprise other solvents that may be characterized as "exempt" solvents, i.e. not causing the formation of ground level ozone (smog), according to environmental chemists. Representative examples include acetone, ethyl acetate, tertiary butyl acetate (TBAc), and isopropanol.

When the spray application system described herein is utilized to apply an aqueous liquid mixture, such as paint, the method may comprise applying more than one coat of the same or different paint compositions. For example, in one embodiment, the method may comprise applying one or more coats of a primer or sealer. In another embodiment, the method may comprise applying one or more coats of a (e.g. colored) base coat. In another embodiment, the method may comprise applying one or more coats of a clear coat. The method may comprise applying a combination of primer, sealer, base coat, and/or clear coat. The method is particularly advantageous for use with (e.g. automobile) base coats that are substantially more expensive than primers, sealers and clear coats.

In some embodiments, 3-4 coats may be applied (e.g. to an automobile panel) wherein each coat, or in other words "film build per wet coat" ranges in thickness from 0.80 to 1.0 mils. Upon drying this can produce a dried film build ranging from about 0.10 to 0.20 mils.

In some embodiments, each coat of the method utilizes an aqueous paint. In other embodiments, at least one coat may be an organic solvent based paint, i.e. a paint comprising greater than 50 wt-% organic solvent that may not form a single phase with water. Organic solvent-based paints typically do not contain any water. For example, solvent-based clear coats may contain organic polar and non-polar solvents such as xylene, acetone, naphtha, alkyl benzene, toluene, heptan-2-one, and the like at a total organic solvent concentration ranging from at least 50 wt.-%, or 60 wt.-% up to about 75 wt.-% or greater.

In one embodied method, a solvent based clear coat is applied to a dried water based base coat.

When the paint comprises organic solvent, the non-fluorinated polymeric binder and/or siloxane (e.g. PDMS) material may be selected to exhibit no solubility or only trace solubility with the organic solvent(s) of the paint, e.g., a solubility of 0.01 grams/liter or 0.001 grams/liter or less.

Alternatively or in combination with having trace solubility, the non-fluorinated polymeric binder and/or the siloxane (e.g. PDMS) material may be selected such that it is compatible with the paint and paint application methods. The non-fluorinated polymeric binder and/or siloxane (e.g. PDMS) material may be present in the paint at higher concentrations, i.e. greater than 0.01 grams/liter, or greater than 0.1 grams/liter, or greater than 0.25 grams/liter, or greater than 0.5 grams/liter; yet still be compatible with the paint and paint application methods. In some embodiments, non-fluorinated polymeric binder and/or siloxane (e.g. PDMS) material may function as a paint additive and be present in the paint at concentrations ranging from about 0.5 grams/liter to 1, 1.5, 2, 2.5, or 3 wt-% of the paint.

There are various approaches that can be taken to determine the compatibility of the non-fluorinated polymeric binder and/or siloxane (e.g. PDMS) material with the paint.

In one approach, when opposing major surface layers of the dried paint comprise substantially the same concentration (difference of less than 10, 5 or 1% relative to the major surface having the higher concentration) of non-fluorinated polymeric binder and/or siloxane (e.g. PDMS) material, such materials can be characterized as chemically compatible with the paint.

In another approach, the siloxane (e.g. (PDMS) material may be sufficiently compatible with the paint such that the presence thereof does not affect the inter-layer adhesion of a painted substrate. This can be evaluated according to Standard Test Method for Measuring Adhesion by Tape Test (ASTM D3359-09). When the cross-hatch adhesion is substantially the same relative to a control of the same paint in the absence of the lubricant (or the combination of lubricant and hydrophobic layer), the presence of the lubricant (or the combination of lubricant and hydrophobic layer) can be characterized as not affecting the inter-layer adhesion. Typically, 90, 95, or 100% of the paint is retained after cross-hatch adhesion testing according to ASTM D3359-09. The non-fluorinated polymeric binder and/or siloxane (e.g. PDMS) material may be sufficiently compatible with the paint such that the presence thereof does not affect the inter-layer adhesion of a painted substrate.

In yet another approach, the non-fluorinated polymeric binder and/or siloxane (e.g. PDMS) material may be sufficiently compatible with the paint such that the siloxane (e.g. PDMS) material does not affect the method of applying the paint. For example, additional coats of the same paint can be uniformly applied at a sufficient film build as previously described. In yet another example, additional coats of a different paint (e.g. a clear coat applied to a dried base coat) can be uniformly applied at a sufficient film build as previously described. Lack of uniformity across the painted panel or substrate can typically be visually detected by observing the occurrence of "fisheyes" or other incompatibility-related coating defects while applying the paint and/or by uneven gloss and/or color that can be measured after the applied paint has dried.

The liquid repellent surface (e.g. layer) of the article (e.g. component, liquid reservoir, liner, or lid) can be provided by one of the embodied siloxane materials previously described or any suitable combination of such siloxane materials with each other, or any suitable combination of such siloxane material(s) with the lubricant impregnated materials and/or fluorinated materials described in WO2016/069674. Further, one of the articles (e.g. components) can have a different embodied material than another article (e.g. component). For example, the reservoir and/or lid may comprise Lexan™ 1414 T; whereas the liner comprises a thermally processible polymer and a siloxane copolymer melt additive.

Unless specified otherwise, the following definitions are applicable to the presently described invention.

The recitation of any numerical range by endpoints is meant to include the endpoints of the range, all numbers within the range, and any narrower range within the stated range.

The term "a", "an", and "the" are used interchangeably with "at least one" to mean one or more of the elements being described.

The term "and/or" means either or both. For example, the expression "A and/or B" means A, B, or a combination of A and B.

The term "alkylene" refers to a divalent group that is a radical of an alkane and includes groups that are linear, branched, cyclic, bicyclic, or a combination thereof. The alkylene group typically has 1 to 30 carbon atoms. In some embodiments, the alkylene group has 1 to 20 carbon atoms, 1 to 10 carbon atoms, 1 to 6 carbon atoms, or 1 to 4 carbon atoms.

The term "alkoxy" refers to refers to a monovalent group having an oxy group bonded directly to an alkyl group.

The term "aryl" refers to a monovalent group that is aromatic and carbocyclic. The aryl has at least one aromatic ring and can have one or more additional carbocyclic rings that are fused to the aromatic ring. Any additional rings can be unsaturated, partially saturated, or saturated. Aryl groups often have 6 to 20 carbon atoms, 6 to 18 carbon atoms, 6 to 16 carbon atoms, 6 to 12 carbon atoms, or 6 to 10 carbon atoms.

The term "fluorinated" refers to a group or compound that contains at least one fluorine atom attached to a carbon atom. Perfluorinated groups, in which there are no carbon-hydrogen bonds, are a subset of fluorinated groups.

Objects and advantages of this invention are further illustrated by the following examples, but the particular materials and amounts thereof recited in these examples, as well as other conditions and details, should not be construed to unduly limit this invention.

Test Methods

IR data was obtained using a Nicolet 6700 Series FT-IR spectrometer (Thermo Scientific, Waltham, Mass.).

Method for Contact Angle Measurements

Water contact angles were measured using a Rama-Hart goniometer (Ramé-Hart Instrument Co., Succasunna, N.J.). Advancing ($\theta_{adv}$) and receding ($\theta_{rec}$) angles were measured as water was supplied via a syringe into or out of sessile droplets (drop volume ~5 µL). Measurements were taken at 2 different spots on each surface, and the reported measurements are the averages of the four values for each sample (a left-side and right-side measurement for each drop).

Contact angles were also evaluated in the same manner using a 90/10 by wt. mixture of water/butoxyethanol instead of water.

Test Method 1 for Paint Repellency Evaluation

Test surfaces were submerged in the PPG Envirobase paint and allowed to sit overnight. The test substrates were then removed from the paint and held vertically for 5 min to allow the paint to potentially flow off of the coating. The fraction (expressed as a percentage) of the surface that was still covered by paint was estimated by visual inspection.

Test Method 2 for Paint Repellency Evaluation—

Sample articles (e.g. components) or pieces thereof measuring approximately 4 cm×4 cm having a liquid repellent surface can be prepared as described below and the initial masses measured. The PPG Envirobase paint was pipetted onto these film pieces until the entire surface was covered with paint. The painted film samples were then turned vertically for 5 minutes to allow paint to drain off of the surface. The masses of the drained film pieces were measured to determine the mass of paint residue remaining on the surface. The drained pieces were also visually inspected to estimate the fraction (expressed as a percentage) of the film surface that remains coated by the paint.

Test Method 3 for Paint Repellency Evaluation:

70 g of PPG Envirobase automotive paint was poured into the liner having the repellent interior surface and a comparative liner (CE. F) that was the same liner without the repellent interior surface. The liners were manually shaken and rotated to ensure that the paint contacted all of the container side walls. The paint was then poured out of the liners, and the liners were placed upside down for 5 minutes (liner with repellent interior) or other specified period of time to allow more of the paint to drain. The liners were each reweighed and the mass of retained paint was calculated.

Test Method 4 for Paint Repellency Evaluation:

A single drop of the (e.g. PPG Envirobase) paint, approximately 0.2 mL, was applied at 21° C. to a central portion of the (e.g. repellent surface of the) sample (7.5 cm by 5.0 cm coated glass microscope slide). The sample (e.g. glass slide) was immediately orientated vertically. If the paint drop slid down the glass slide, it was denoted "Pass", if not "Fail". In some samples that passed, a thin strip of paint (<20% the thickness of the initial drop) or a few small droplets of paint remained on the surface after the paint drop slid down.

Test Method 5 for Paint Repellency Evaluation:

The entire non-repellent surface of the sample (i.e. uncoated side of the 7.5 cm by 5.0 cm glass slide) was masked with tape, obtained from 3M Company under the trade designation "SCOTCHBLUE PAINTERS TAPE". The sample (glass slide) was then immersed in the (e.g. PPG Envirobase) paint to a depth of 3.5 cm for 10 minutes at 21° C. (or in other words about half the coated surface was immersed). The sample (glass slide) was removed from the diluted paint, orientated vertically for 30 seconds, and the masking tape removed. The paint remaining on the immersed coated surface was then visually estimated and expressed as percentage of retained paint coverage.

Test Method 6 for Paint Repellency Evaluation:

A sample of sufficient size (2.8 by 3.2 cm) was weighed. The entire non-repellent surface of the sample (i.e. uncoated side) was masked with "SCOTCHBLUE PAINTERS TAPE". The repellent surface of the sample was entirely submerged (e.g. 30 g) in the (e.g. PPG Envirobase) paint for 10 minutes at 21° C. The sample was then removed from the paint, the masking tape removed, and the sample orientated vertically by means a binder clip for 1 minute. The bottom edge of the sample was contacted with a paper towel to wick away paint that may have pooled along the bottom edge of the material. The weight of each sample was again measured and the amount of paint remaining per area was calculated. The paint remaining on the coated surface was visually estimated and expressed as percentage of retained paint coverage.

Unless specified otherwise, the test paint for determining paint repellency according to the test methods described herein was PPG Envirobase automobile paint mixed to specification containing 90 weight % ENVIROBASE HIGH PERFORMANCE T409 DEEP BLACK and 10 weight % ENVIROBASE HIGH PERFORMANCE T494 PAINT THINNER, available from PPG Industries, Pittsburgh Pa. or available from 3M, St. Paul, Minn.

Example 100 (EX100)—Preparation of Film with Siloxane Melt Additive

A siloxane melt additive (alkyl dimethicone) was synthesized as described in Example 14 of U.S. Pat. No. 9,187,678, (SMA). The alkyl dimethicone was compounded into NA217000 LDPE (Lyondell Basell, Houston, Tex.) at a loading of 15 wt. % using a 25 mm twin screw extruder held at 190° C. The alkyl dimethicone was delivered to the extruder as a liquid at 120° C. by means of a heated gear pump and transfer line. The masterbatch melt was extruded through a stranding die into a chilled water bath and pelletized at a rate of 13.6 Kg/hour.

These 15 wt. % alkyl dimethicone masterbatch pellets were then admixed with NA217000 LDPE pellets at a ratio which yielded a pellet mixture comprising 3 wt. % alkyl dimethicone in LDPE. This 3 wt % alkyl dimethicone mixture was extrusion coated sequentially onto both sides of 2 mil thick PET film (primed on both sides, 3M Company) using the following procedure. The pellet blend was fed, via a single feed hopper, at a rate of 20 lbs/hr into an extruder and die operating at a temperature of 500° F. The composite extrudate exited the drop die opening and traveled approximately 10 cm to a nip where the composite was contacted with the primed PET and solidified through a two roll nip equipped with a rubber and a steel roller. The alkyl dimethicone/LDPE layer contacted a smooth chilled steel roll which was used to accelerate the solidification of the layers. The line speed was 50 ft/min, yielding an extruded layer thickness of 1 mil. The final film construction consisted of a 2 mil thick PET film sandwiched between 1 mil thick layers comprising 3 wt. % alkyl dimethicone in LDPE.

The paint repellency of EX100 was also evaluated according to Test Method 2 as previously described. The results were as follows:

| Example | Mass Paint on Surface (g/cm$^2$) | Percentage of Surface Coated with Paint |
|---|---|---|
| EX100 | 0.00074 | 5% |

The paint repellency of EX100 was also evaluated according to Test Method 6 as previously described using a 4 cm×4 cm sample size. The results were as follows:

| Example | Mass Paint on Surface (g/cm$^2$) | Percentage of Surface Coated with Paint |
|---|---|---|
| EX100 | 0.0035 | 15% |

Surface Abrasion Test

A sample of sufficient size (e.g., 6 cm by 2 cm) was prepared and mounted on a Taber Abraser (Taber Industries 5750 Linear Abraser). A crockmeter square (AATC Crockmeter Square from Testfabrics, Inc.) was attached to the abraser head by means of a rubber band. No additional weights were placed on top of the abraser head. The cycle speed was set to 15 cycles/min, and each substrate was subjected to 2 abrasion cycles (or in other words the abraser head passed back and forth twice).

Contact angles with a solution containing 10% by weight of 2-n-butoxyethanol and 90% by weight deionized water and paint repellency were tested after being subjected to this surface abrasion.

| | 10% (by wt.) aqueous 2-n-butoxyethanol Contact Angles After Abrasion | | | Paint Repellency |
|---|---|---|---|---|
| Example | $\theta_{adv}$ | $\theta_{rec}$ | CAH ($\theta_{adv} - \theta_{rec}$) | After Abrasion Test Method 4 |
| EX100 | 53 | 45 | 8 | Pass |

The repellency of EX100 after abrasion was also evaluated by measuring the contact angles with water as previously described. The results were as follows:

| | Water Contact Angles After Abrasion | | |
|---|---|---|---|
| Example | $\theta_{adv}$ | $\theta_{rec}$ | CAH ($\theta_{adv} - \theta_{rec}$) |
| EX100 | 109 | 99 | 10 |

The paint repellency of EX100 after abrasion was also evaluated according to Test Method 2 with the PPG paint as previously described, except 2.2 cm×3.2 cm substrates were used in place of 4 cm×4 cm samples. The results were as follows:

| Example | Mass Paint on Surface (g/cm$^2$) After Abrasion | Percentage of Surface Coated with Paint After Abrasion |
|---|---|---|
| EX100 | 0.00040 | <5% |

The paint repellency of EX100 after abrasion were also evaluated according to Test Method 6 with PPG paint as previously described, except 2.2 cm×3.2 cm substrates were used in place of 4 cm×4 cm samples. The results were as follows:

| Example | Mass Paint on Surface (g/cm$^2$) | Percentage of Surface Coated with Paint |
|---|---|---|
| EX100 | 0.0018 | 10% |

Materials

| Material Designation | Description | Obtained from |
|---|---|---|
| NA217000 LDPE | NA217000 low density polyethylene | Lyondell Basell, Houston, TX |
| Marflex 1122 LDPE | Marflex 1122 low density polyethylene | Chevron Phillips, The Woodlands, TX |

-continued

| Material Designation | Description | Obtained from |
|---|---|---|
| PE100 LLDPE | CP PRYME ® PE100LLD-50M linear low density polyethylene | Chase Plastics, Clarkston, MI |
| butoxyethanol | 2-n-butoxyethanol | Alfa Aesar, Ward Hill, MA |
| UHMW Siloxane | Dow Corning ® MB50-002 ultra high molecular weight siloxane dispersed in low density polyethylene | Dow Corning, Midland, MI |
| IPA | isopropanol | BDH Chemicals/VWR, Radnor, PA |
| NMP | n-methyl-2-pyrrolidone | TCI America, Portland, OR |
| Lexan ™ 1414T | Lexan ™ EXL1414T polycarbonate-siloxane copolymer | Saudi Arabia Basic Industries Corporation (SABIC), Riyadh, Saudi Arabia |
| PPS ™ liners | thermoformed low density polyethylene (400 ml) | 3M |

Preparation of Additional Examples with Siloxane Melt Additive

Two cast web films with an overall film thickness of ~40 mils—PE101 and PE102—were produced using the SMA/NA217000 masterbatch. Both films comprised 3 layers of approximately equal thicknesses (~13.3 mils per layer, total thickness about 40 mils). For PE101, all layers were produced by mixing pellets of the aforementioned masterbatch with pellets of NA217000 LDPE such that the composition of each layer comprised 97/3 (by wt) NA217000/SMA. The outer (A or air-side) layer was produced by extruding the 97/3 LDPE/SMA mixture through a 27 mm twin screw extruder through a neck tube and gear pump into the top layer of the 3 layer feed block and die. This melt train used a progressive temperature extrusion profile, with peak temperatures of ~250° C. The middle (B) layer was produced by extruding the 97/3 LDPE/SMA mixture through a 27 mm twin screw extruder with a progressive temperature profile peaking at or around 275-280° C. through a neck tube and gear pump into the middle layer of the feed block and die. The bottom (C or wheel side) layer was produced by extruding the 97/3 LDPE/SMA mixture through a 25 mm twin screw extruder through a neck tube and gear pump into the bottom layer of the feed block and die. Once again, a progressive temp profile was used with peak temperatures of 280 to 285° C. The feedblock/die was held at a target temp of 270 to 275° C. while the casting wheel was run at about 80-85° C. Film PE102 was made using essentially identical processing conditions as PE101, except the composition varied from layer to layer in this sample. The air-side (A) and middle (B) layers comprised Marflex 1122 LDPE, whilst the wheel side (C) layer comprised a mixture of NA217000/SMA masterbatch and Marflex 1122 such that the C layer composition was 85/12/3 (by wt) Marflex 1122/NA217000/SMA.

Both of the 40 mil thick film samples were thermoformed into 400 ml PPS™ liners, summarized as follows:

| Example | SMA Loading | Sample Description |
|---|---|---|
| CE1 | 0 | commercial 400 mL PPS ™ liner |
| EX101 | 3 wt. % | 3 wt. % SMA in NA217000 LDPE |
| EX102 | 3 wt. % in 'skin' | 3 wt. % SMA in NA217000 LDPE/Marflex 1122 LDPE 'skin,' backed by Marflex 1122 LDPE |

A polycarbonate-siloxane copolymer coating was prepared by dissolving 2.5 wt.-% of the indicated polymer in solvent as described below.

| Solvent | Wt. % Polycarbonate-Siloxane | Polycarbonate-Siloxane Polymer(s) |
|---|---|---|
| Coating 1 - 80/20 NMP/IPA | 2.5 | Lexan ™ 1414T |

To prepare Example EX103, the coating solution was applied to the inside walls of the spray gun paint container using a pipette as follows: the bottom of a LDPE PPS™ container was first wet with the coating solution, and the solvent was allowed to evaporate under ambient conditions. The container was then tilted 90° and a pipette was used to coat a strip of the interior side wall of the container. Next, the container was manually rotated to obtain complete wetting of the entire interior sidewall by the coating solution. Excess coating solution was drained by flipping the container upside down, and the solvent was allowed to evaporate in an oven at 80° C. for 15 minutes (polyethylene liners). Paint repellency was determined according to Test Method 3 as follows:

Paint containers or spray application system coated with polycarbonate-siloxane materials.

| Example | Base Container | Coating Material | Identity of Polycarbonate-Siloxane Polymer(s) |
|---|---|---|---|
| EX103 | 400 mL polyethylene liner | Coating 1 | Lexan ™ 1414T |

The paint repellency of the aforementioned containers having the repellent interior surfaces and comparative containers was evaluated according to Test Method 3 as previously described. The mass of the containers was also measured after 5, 90, and 180 minutes.

Paint repellency of sample paint containers as quantified using Test Method 3.

| | Mass Empty Liner | Mass of Paint Retention Following Drainage Time Specified in Row Below (g) | | | Mass Per Surface Area Calculation (at t = 90 min, |
|---|---|---|---|---|---|
| Example | (g) | 5 min | 90 min | 180 min | g/cm$^2$) |
| CE1 | 5.89 | 8.72 | 4.28 | 3.39 | 0.015 |
| EX101 | 5.86 | 3.53 | 0.84 | 0.44 | 0.004 (80% less paint retained*) |

-continued

| Example | Mass Empty Liner (g) | Mass of Paint Retention Following Drainage Time Specified in Row Below (g) | | | Mass Per Surface Area Calculation (at t = 90 min, g/cm$^2$) |
|---|---|---|---|---|---|
| | | 5 min | 90 min | 180 min | |
| EX102 | 5.48 | 7.61 | 1.67 | 1.05 | 0.006 (61% less paint retained) |
| EX103 | 5.83 | 8.14 | 1.64 | 0.54 | 0.006 (62% less paint retained) |

*(4.28 − 0.84)/4.28 × 100%

Preparation of LDPE/Ultra High Molecular Weight (UHMW) Siloxane Film (EX104).

A film comprising 97.5/2.5 (by wt) LDPE/UHMW siloxane was produced by adding 9.5 g LDPE (Chevron Phillips Marflex 1122) and 0.5 g of UHMW siloxane masterbatch (Dow Corning MB 50-002; 50/50 by wt siloxane/LDPE pellets) into a DSM compounder (DSM Xplore Micro 15cc Twin Screw Compounder). The compounder was held constant at 170° C. and the screw speed was set to 40 rpm/10,000 N. After allowing the melted resin to recirculate and mix in the compounder for 10 minutes, the melt was extruded through a slotted die and the resultant 28 mm wide, 0.1-0.2 mm thick film was wound onto a 3" fiber core.

Fluid Contact Angles and Paint Repellency of Various Test Surfaces

Pieces were cut from the sides of a commercially available 400 mL PPS™ liner, from the sides of the thermoformed SMA-containing liners (EX101 and EX102), from the sides of the polycarbonate-siloxane coated LDPE liners (EX103), and from the roll of LDPE/UHMW Siloxane (EX104). These cut pieces of film were used for contact angle testing with water and with a solution containing 10% by weight of 2-n-butoxyethanol and 90% by weight deionized water instead of deionized water. The measured contact angle data for these samples are provided below, along with the characterization data for these samples using Paint Repellency Test Method 4.

| Example | Water Contact Angles | | | 10% (by wt.) aqueous 2-n-butoxyethanol Contact Angles | | | Paint Repellency Test Method 4 |
|---|---|---|---|---|---|---|---|
| | $\theta_{adv}$ | $\theta_{rec}$ | CAH ($\theta_{adv} - \theta_{rec}$) | $\theta_{adv}$ | $\theta_{rec}$ | CAH ($\theta_{adv} - \theta_{rec}$) | |
| CE1 | 105 | 95 | 10 | 51 | 21 | 30 | Fail |
| EX101 | 111 | 95 | 16 | 54 | 46 | 8 | Pass |
| EX102 | 111 | 99 | 12 | 55 | 46 | 9 | Pass |
| EX103 | 107 | 99 | 8 | 54 | 45 | 9 | Pass |
| EX104 | 116 | 87 | 29 | 60 | 40 | 20 | Pass |

Paint Repellency was also evaluated according to Test Method 2

| Example | Mass Paint on Surface (g/cm$^2$) | Percentage of Surface Coated with Paint |
|---|---|---|
| CE1 | 0.022 | ~95% |
| EX101 | 0.004 | ~15% |
| EX102 | 0.006 | ~10% |
| EX103 | 0.006 | ~20% |
| EX104 | 0.003 | ~25% |

Paint Repellency was also evaluated according to Test Method 6 as previously described using a 4 cm×4 cm sample size.

| Example | Mass Paint on Surface (g/cm$^2$) | Percentage of Surface Coated with Paint |
|---|---|---|
| CE1 | 0.022 | ~95% |
| EX101 | 0.004 | ~15% |
| EX102 | 0.006 | ~20% |
| EX103 | 0.007 | ~25% |
| EX104 | 0.013 | ~60% |

The test surfaces EX1-EX3 and EX5 were subjected to the Surface Abrasion Test. Contact angles with a solution containing 10% by weight of 2-n-butoxyethanol and 90% by weight deionized water and paint repellency as quantified by Test Method 4 were measured after each test substrate was subjected to this surface abrasion.

| Example | 10% (by wt.) aqueous 2-n-butoxyethanol Contact Angles After Abrasion | | | Paint Repellency Test Method 4 After Abrasion |
|---|---|---|---|---|
| | $\theta_{adv}$ | $\theta_{rec}$ | CAH ($\theta_{adv} - \theta_{rec}$) | |
| EX101 | 54 | 44 | 10 | Pass |
| EX102 | 53 | 44 | 9 | Pass |
| EX103 | 50 | 43 | 7 | Pass |
| EX104 | 63 | 38 | 25 | Pass |

The repellency after abrasion were also evaluated by measuring the contact angles with water as previously described. The results were as follows:

| Example | Water Contact Angles After Abrasion | | |
|---|---|---|---|
| | $\theta_{adv}$ | $\theta_{rec}$ | CAH ($\theta_{adv} - \theta_{rec}$) |
| EX101 | 108 | 92 | 16 |
| EX102 | 112 | 96 | 16 |
| EX103 | 106 | 93 | 13 |
| EX104 | 111 | 81 | 30 |

Paint Repellency was also evaluated according to Test Method 2, except 2.2 cm×3.2 cm sized samples were used in place of 4 cm×4 cm samples.

| Example | Mass Paint on Surface (g/cm$^2$) After Abrasion | Percentage of Surface Coated with Paint After Abrasion |
|---|---|---|
| EX101 | 0.003 | ~5% |
| EX102 | 0.003 | ~10% |

-continued

| Example | Mass Paint on Surface (g/cm$^2$) After Abrasion | Percentage of Surface Coated with Paint After Abrasion |
|---|---|---|
| EX103 | 0.002 | ~5% |
| EX104 | 0.005 | ~20% |

Panel Painting Using Base Coats which had Contacted Siloxane-Functional Materials Two types of experiments were done to ascertain whether "fish-eyeing" is problematic when waterborne base coats contact the siloxane-functional surfaces described herein. The first type of experiment involved pouring a ready-to-spray paint mixture into the repellent containers of EX101-EX103. The "ready-to-spray" mixture contained 88 wt. % of ENVIROBASE HIGH PERFORMANCE T407 JET BLACK and 12 weight % ENVIROBASE HIGH PERFORMANCE T494 PAINT THINNER, available from PPG Industries.

These repellent containers were used in conjunction with industry-standard spray application equipment to spray PPG Envirobase paint. Once this base coat was dry, a coat of clearcoat was applied to the panel (the clearcoat was obtained from PPG Industries, Inc. as the trade designation EC530 PERFORMANCE CLEARCLOAT). The paint could be uniformly applied at a sufficient film build. There was no evidence of "fisheyes" or other incompatibility-related coating defects while applying the paint and/or by uneven gloss and/or color.

The second type of experiment was completed with the UHMW siloxane material. In this experiment, 6.3 g of the MB50-002 resin pellets obtained from Dow-Corning (siloxane content of 50%) and 50 g the ready-to-spray paint mixture were mixed in a commercial 400 mL PPS™ liner. The pellets were soaked in the Envirobase at room temperature for 7 days, at which point the Envirobase base coat and EC530 En-V™ clearcoat were sprayed onto an automotive panel as described above. The paint could be uniformly applied at a sufficient film build, and there was no evidence of "fisheyes" or other incompatibility-related coating defects while applying the paint and/or by uneven gloss and/or color.

Some additional test liquids were utilized to evaluated liquid repellency using Test Method 2. The length of time the sample film was held vertically to allow the liquid to drain in indicated. The test results are as follows:

| | Results for CE1 (LDPE) | | Results for EX101 (97/3 LDPE/SMA) | |
|---|---|---|---|---|
| Test Liquid | Average Retained Mass (mg) (g/cm$^2$) | Average % of Surface Covered by Fluid | Average Retained Mass (mg) (g/cm$^2$) | Average % of Surface Covered by Fluid |
| Poly(propylene glycol), 400 Mw (Polysciences Inc., Warrington, PA) - 30 minutes | 70.7 (0.004) | 75 | 15.5 (0.00097) | 5 |
| Butoxyethanol (100%) - 0.5 ml applied and a 30 second drain time | (0.0019) | 100 | (0.00094) | 1 |
| Solution of 50 wt. % butoxyethanol and 50 wt. % water - 0.5 ml applied and a 30 second drain time | (0.0018) | 95 | (0.000163) | 5 |

Preparation of Stir Sticks—

Stir sticks with several different compositions were prepared using an injection molding process. The PE100 LLDPE pellets and the SMA/LDPE masterbatch pellets were first admixed as solid pellets in the desired weight ratio (e.g., to yield a 3 wt. %, 5 wt. %, 7.5 wt. %, or 15 wt. % OMS sample). The two types of pellets were placed in a container and tumbled to form a well dispersed pellet mixture. This pellet mixture was then fed into the hopper of an Arburg 221K 28 ton press. The pellet mixture was melted at 390° F. and fed into the mold which was held at 100° F. The cycle time for this operation was 30 seconds. The finished sticks were approximately 240 mm in length, 3 mm thick, and with a tapered width varying from 15 mm on one end to 27 mm on the other end. The compositions of the five different samples are summarized as follows:

| Example | Weight Fraction of SMA in LLDPE |
|---|---|
| CE2 | 0% |
| EX105 | 3.0% |
| EX106 | 5.0% |
| EX107 | 7.5% |
| EX108 | 15.0% |

Test Method 7—

240 mL of the 88/12 ready to spray paint was poured into a 400 mL plastic beaker, such that the fluid height was approximately 6.35 cm from the inner bottom of the beaker. Three replicas of each of CE2 and EX105-EX108 were weighed. Each stir stick was held vertically and lowered quickly into the paint until the stir stick contacted the bottom of the plastic beaker. Each stir stick was held in this submerged position for five seconds before being removed from the paint and hung in a vertical position to allow the fluid to drain and dewet from the stir stick. The duration of time over which the paint drained was recorded using a stopwatch. These stir sticks were then allowed to hang in the ambient environment for 12 hours. The masses of the stir sticks were measured after this 12 hour dry time to determine the amount of dried paint adhered to each stir stick.

| Example | Weight Fraction of SMA in LLDPE | Average Drain Time (sec) | Average Paint Retained (g) |
|---------|-------------------------------|--------------------------|----------------------------|
| CE2     | 0%                            | no movement              | 0.075                      |
| EX105   | 3.0%                          | 170                      | 0.019                      |
| EX106   | 5.0%                          | 164                      | 0.025                      |
| EX107   | 7.5%                          | 148                      | 0.019                      |
| EX108   | 15.0%                         | 155                      | 0.024                      |

What is claimed is:

1. A liquid reservoir comprising a liquid repellent surface such that the receding contact angle with a solution containing 10% by weight of 2-n-butoxyethanol and 90% by weight deionized water is at least 35 degrees; wherein the liquid repellent surface comprises a surface layer comprising a silane or siloxane material and the liquid repellent surface is not a lubricant impregnated surface.

2. The liquid reservoir of claim 1 wherein the liquid repellent surface comprises a solid liquid repellent material.

3. The liquid reservoir of claim 1 wherein the siloxane material comprises at least 50 wt.-% polydimethylsiloxane.

4. The liquid reservoir of claim 1 wherein the siloxane material comprises a siloxane backbone and hydrocarbon side chains averaging at least 8 carbon atoms and no greater than 50 carbon atoms.

5. The liquid reservoir of claim 1 wherein the siloxane material comprising polydimethylsiloxane does not comprise vinyl groups or other groups that form a crosslinked network.

6. The liquid reservoir of claim 1 wherein the liquid repellent surface is liquid repellent after 2 abrasion cycles at 15 cycles/minute with a Taber Linear Abraser.

7. The liquid reservoir of claim 1 wherein the liquid reservoir is a liquid reservoir liner.

8. The liquid reservoir of claim 1 wherein the liquid reservoir comprises a thermoplastic polymeric material.

9. The liquid reservoir of claim 1 wherein the liquid repellent surface is liquid repellent such that retained paint has a mass no greater than 0.01 g/cm$^2$.

10. The liquid reservoir of claim 1 wherein the liquid repellent surface has a receding contact angle with water from 90 degrees to 135 degrees.

11. The liquid reservoir of claim 1 wherein the liquid repellent surface is liquid repellent such that retained test liquid has a mass no greater than 0.01 g/cm$^2$ when the test liquid is selected from 400 Mw polypropylene glycol, butoxythanol, or a 50 wt. % aqueous solution of butoxyethanol.

12. The liquid reservoir of claim 1 wherein at least the liquid repellent surface of the liquid reservoir comprises a layer of thermally processible polymer and a siloxane material melt additive.

13. The liquid reservoir of claim 12 wherein the siloxane material has a viscosity at 25° C. of 5,000,000 or 10,000,000 centistokes.

14. The liquid reservoir of claim 1 wherein the siloxane material is a copolymer comprising less than 50 wt.-% polydimethylsiloxane.

15. The liquid reservoir of claim 14 wherein the siloxane material is copolymer of polyorganosiloxane and polyolefin or polycarbonate.

16. The liquid reservoir of claim 1 wherein the liquid repellent surface layer repels water-based paint having a volatile organic solvent of at least 5 g/lite; wherein the volatile organic solvent is water-soluble.

17. The liquid reservoir of claim 16 wherein the organic solvent comprises one or more alcohol.

18. The liquid reservoir of claim 16 wherein the organic solvent comprises 2-butoxyethanol, butoxypropan-2-ol, 2-(2-butoxyethoxy)ethanol, and mixtures thereof.

19. An article comprising a liquid repellent surface comprising a silane or siloxane material, wherein the liquid repellent surface is not a lubricant impregnated surface and the liquid repellent surface comprises at least one property selected from
   i) a receding contact angle with a solution containing 10% by weight of 2-n-butoxyethanol and 90% by weight deionized water is at least 35 degrees;
   ii) a drop of paint slides off the liquid repellent surface when orientated vertically;
   iii) a mass of retained paint being no greater than 0.01 g/cm$^2$;
   iv) a mass or retained test liquid selected from 400 Mw polypropylene glycol, butoxythanol, or a 50 wt. % aqueous solution of butoxyethanol being no greater than 0.001 g/cm$^2$;
   or a combination of i), ii), iii), and iv); and
   wherein the article is a cup, can, bucket, bottles, tray or liner thereof, drum, beaker or liner thereof, lid, hose, tube, handle, stirring utensil, pipette or pipette tip, funnel, strainer, filter, pour spouts, protection film, packaging film, or film enclosure.

20. A method of providing a liquid repellent surface comprising;
   providing a film comprising a liquid repellent surface comprising a silane or siloxane material, wherein the liquid repellent surface is not a lubricant impregnated surface and the liquid repellent surface comprises at least one property selected from
   i) a receding contact angle with a solution containing 10% by weight of 2-n-butoxyethanol and 90% by weight deionized water is at least 35 degrees;
   ii) a drop of paint slides off the liquid repellent surface when orientated vertically;
   iii) a mass of retained paint being no greater than 0.01 g/cm$^2$;
   iv) a mass or retained test liquid selected from 400 Mw polypropylene glycol, butoxyethanol, or a 50 wt. % aqueous solution of butoxyethanol being no greater than 0.001 g/cm$^2$;
   or a combination of i), ii), iii), and iv); and
   utilizing the film as a packaging or protection film.

* * * * *